US012656499B2

(12) United States Patent
Hiller et al.

(10) Patent No.: US 12,656,499 B2
(45) Date of Patent: *Jun. 16, 2026

(54) LIDAR OBJECT DETECTION SYSTEM

(71) Applicant: The Boeing Company, Arlington, VA (US)

(72) Inventors: Nathan D. Hiller, Irvine, CA (US); Claudia E. Fritz-Thompson, Bothell, WA (US)

(73) Assignee: The Boeing Company, Arlington, VA (US)

( * ) Notice: Subject to any disclaimer, the term of this patent is extended or adjusted under 35 U.S.C. 154(b) by 734 days.

This patent is subject to a terminal disclaimer.

(21) Appl. No.: 18/166,292

(22) Filed: Feb. 8, 2023

(65) Prior Publication Data

US 2024/0264314 A1    Aug. 8, 2024

(51) Int. Cl.
| | |
|---|---|
| *G01S 17/933* | (2020.01) |
| *G01S 7/481* | (2006.01) |
| *G01S 17/04* | (2020.01) |
| *G01S 17/10* | (2020.01) |
| *G01S 17/58* | (2006.01) |

(52) U.S. Cl.
CPC .......... *G01S 17/933* (2013.01); *G01S 7/4816* (2013.01); *G01S 17/04* (2020.01); *G01S 17/10* (2013.01); *G01S 17/58* (2013.01)

(58) Field of Classification Search
CPC ...... G01S 17/933; G01S 7/4816; G01S 17/04; G01S 17/10; G01S 17/58; G01S 7/4802; G01S 17/42; G01S 17/931; G01S 17/95
See application file for complete search history.

(56) References Cited

U.S. PATENT DOCUMENTS

| | | | |
|---|---|---|---|
| 4,983,844 A | 1/1991 | Korevaar | |
| 5,216,477 A | 6/1993 | Korb | |
| 5,257,085 A | 10/1993 | Ulich et al. | |
| 5,502,558 A | 3/1996 | Menders et al. | |
| 7,522,291 B2 * | 4/2009 | Hays ...................... G01N 21/47 |
| | | | 356/519 |
| 8,072,584 B2 | 12/2011 | Caldwell et al. | |
| 2004/0027570 A1 | 2/2004 | Caldwell et al. | |
| 2006/0038977 A1 | 2/2006 | Williams et al. | |

(Continued)

FOREIGN PATENT DOCUMENTS

| | | |
|---|---|---|
| EP | 2133712 A1 | 12/2009 |
| WO | 2019209727 A1 | 10/2019 |

OTHER PUBLICATIONS

Office Action, dated Jul. 8, 2025, regarding U.S. Appl. No. 18/166,259, 31 pages.

(Continued)

*Primary Examiner* — Francis Geroleo
(74) *Attorney, Agent, or Firm* — Yee & Associates, P.C.

(57) ABSTRACT

A method, apparatus, system, and computer program product for detecting an object relative to a vehicle. A projected component of a laser radiation is emitted as a set of laser beams into an atmosphere from a vehicle. A backscatter light generated in response to said emitting the laser beam into the atmosphere is received to form a received backscatter light. The received backscatter light is filtered using a tunable optical filter system to form a filtered backscatter light. A control component derived from the laser radiation is filtered using the tunable optical filter system to form a filtered reference light. A set of parameters relating a presence of the object relative to the vehicle is determined using the filtered backscatter light and the filtered reference light.

23 Claims, 19 Drawing Sheets

(56)                  References Cited

U.S. PATENT DOCUMENTS

| | | | |
|---|---|---|---|
| 2006/0262324 A1 | 11/2006 | Hays et al. | |
| 2013/0336656 A1 | 12/2013 | Belansky et al. | |
| 2015/0185246 A1 | 7/2015 | Dakin et al. | |
| 2018/0081045 A1* | 3/2018 | Gylys | G01S 7/487 |
| 2018/0202928 A1 | 7/2018 | Abdulhalim | |
| 2019/0101633 A1* | 4/2019 | Warke | G01S 7/4021 |
| 2020/0309952 A1 | 10/2020 | Imaki et al. | |
| 2022/0196838 A1* | 6/2022 | Kapusta | G01S 7/4866 |
| 2022/0244361 A1* | 8/2022 | Imaki | G01S 7/497 |

OTHER PUBLICATIONS

European Patent Office Extended Search Report, dated May 7, 2024, regarding Application No. EP23213296.9, 15 pages.

Oohashi et al., "Degradation Behavior of Narrow-Spectral-Linewidth DFB Lasers for Super-Wide-Band FM Conversion," IEEE Journal of Selected Topics in Quantum Electronics, vol. 5, No. 3, May-Jun. 1999, 6 pages. https://ieeexplore.ieee.org/document/788405.

Rabadan et al., "Airborne Lidar for Automatic Feedforward Control of Turbulent In-Flight Phenomena," Journal of Aircraft, vol. 47, No. 2, Mar.-Apr. 2010, EADS Innovation Works, 81663 Muenchen, Germany, 12 pages. https://arc.aiaa.org/doi/10.2514/1.44950.

Hiller et al., "Lidar Sensor System with a Tunable Optical Filter," U.S. Appl. No. 18/166,259, filed Jan. 8, 2023, 88 pages.

European Patent Office Action, dated Aug. 21, 2025, regarding EP Application No. 23213296.9, 9 pages.

Final Office Action, dated Oct. 24, 2025, regarding U.S. Appl. No. 18/166,259, 33 pages.

Office Action, dated Dec. 17, 2025, regarding U.S. Appl. No. 18/166,259, 26 pages.

* cited by examiner

400

500

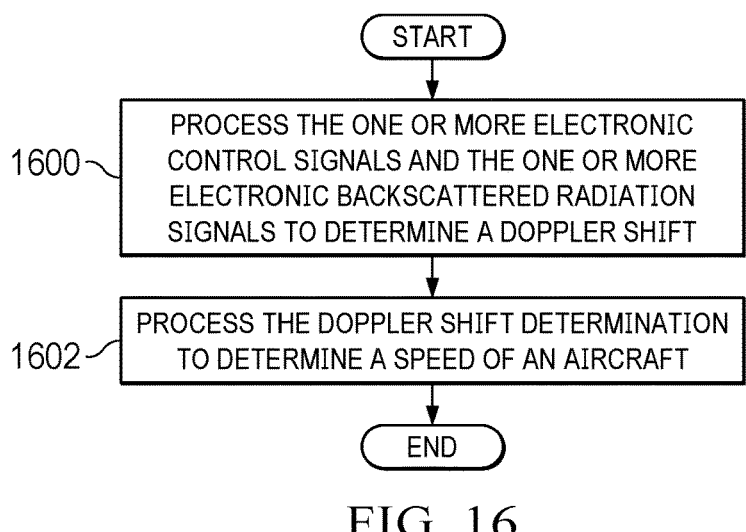

START

1600 — PROCESS THE ONE OR MORE ELECTRONIC CONTROL SIGNALS AND THE ONE OR MORE ELECTRONIC BACKSCATTERED RADIATION SIGNALS TO DETERMINE A DOPPLER SHIFT

1602 — PROCESS THE DOPPLER SHIFT DETERMINATION TO DETERMINE A SPEED OF AN AIRCRAFT

END

FIG. 16

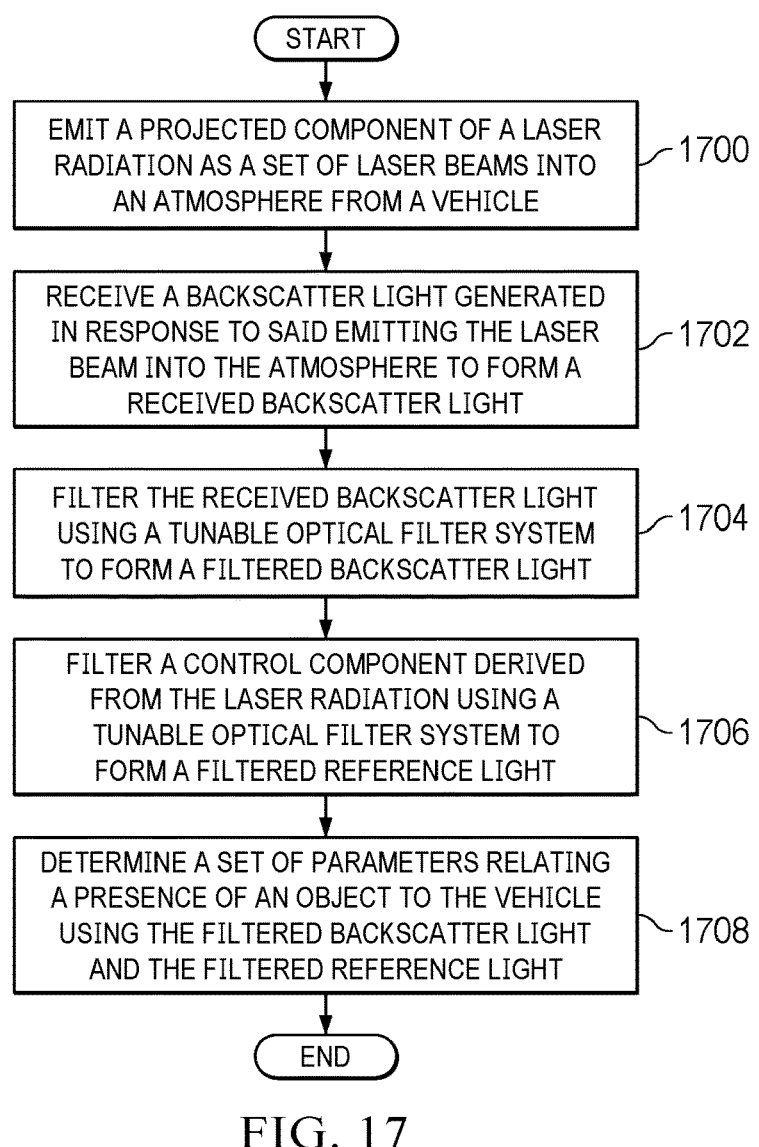

START

EMIT A PROJECTED COMPONENT OF A LASER RADIATION AS A SET OF LASER BEAMS INTO AN ATMOSPHERE FROM A VEHICLE — 1700

RECEIVE A BACKSCATTER LIGHT GENERATED IN RESPONSE TO SAID EMITTING THE LASER BEAM INTO THE ATMOSPHERE TO FORM A RECEIVED BACKSCATTER LIGHT — 1702

FILTER THE RECEIVED BACKSCATTER LIGHT USING A TUNABLE OPTICAL FILTER SYSTEM TO FORM A FILTERED BACKSCATTER LIGHT — 1704

FILTER A CONTROL COMPONENT DERIVED FROM THE LASER RADIATION USING A TUNABLE OPTICAL FILTER SYSTEM TO FORM A FILTERED REFERENCE LIGHT — 1706

DETERMINE A SET OF PARAMETERS RELATING A PRESENCE OF AN OBJECT TO THE VEHICLE USING THE FILTERED BACKSCATTER LIGHT AND THE FILTERED REFERENCE LIGHT — 1708

END

FIG. 17

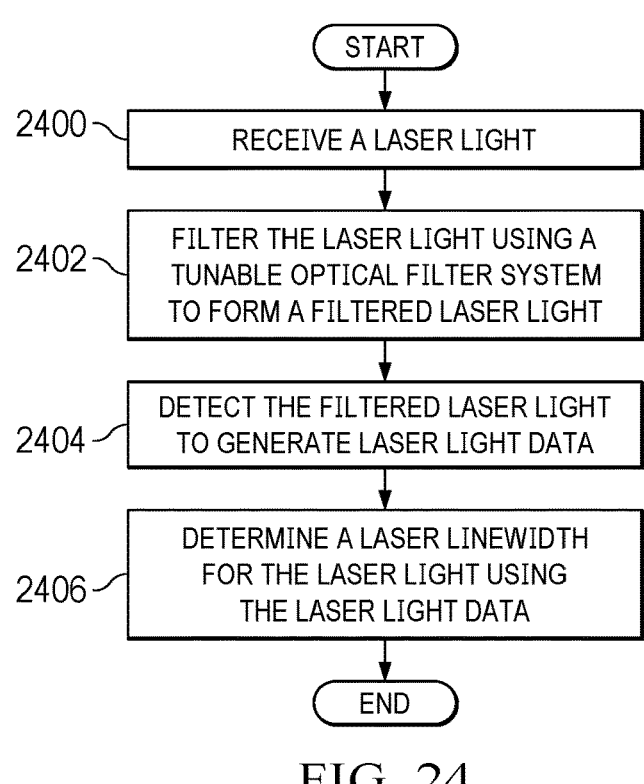

START

2400 — RECEIVE A LASER LIGHT

2402 — FILTER THE LASER LIGHT USING A TUNABLE OPTICAL FILTER SYSTEM TO FORM A FILTERED LASER LIGHT

2404 — DETECT THE FILTERED LASER LIGHT TO GENERATE LASER LIGHT DATA

2406 — DETERMINE A LASER LINEWIDTH FOR THE LASER LIGHT USING THE LASER LIGHT DATA

END

FIG. 24

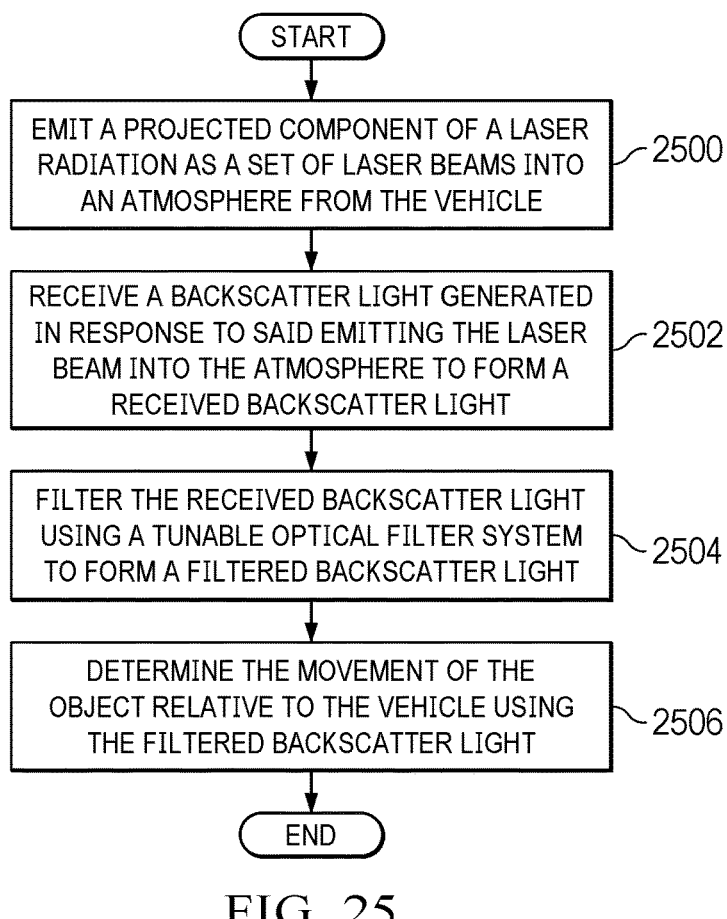

START

EMIT A PROJECTED COMPONENT OF A LASER RADIATION AS A SET OF LASER BEAMS INTO AN ATMOSPHERE FROM THE VEHICLE — 2500

RECEIVE A BACKSCATTER LIGHT GENERATED IN RESPONSE TO SAID EMITTING THE LASER BEAM INTO THE ATMOSPHERE TO FORM A RECEIVED BACKSCATTER LIGHT — 2502

FILTER THE RECEIVED BACKSCATTER LIGHT USING A TUNABLE OPTICAL FILTER SYSTEM TO FORM A FILTERED BACKSCATTER LIGHT — 2504

DETERMINE THE MOVEMENT OF THE OBJECT RELATIVE TO THE VEHICLE USING THE FILTERED BACKSCATTER LIGHT — 2506

END

2702 — SPECIFICATION AND DESIGN

2704 — MATERIAL PROCUREMENT

2706 — COMPONENT AND SUBASSEMBLY MANUFACTURING

2708 — SYSTEM INTEGRATION

2710 — CERTIFICATION AND DELIVERY

2712 — IN SERVICE

2714 — MAINTENANCE AND SERVICE

2800

AIRCRAFT

2802 — AIRFRAME        INTERIOR — 2806

SYSTEMS

PROPULSION SYSTEM        ELECTRICAL SYSTEM 2808   2812        2810   2814

HYDRAULIC SYSTEM        ENVIRONMENTAL SYSTEM

2804

LIDAR OBJECT DETECTION SYSTEM

CROSS-REFERENCE TO RELATED APPLICATION

This application is related to the following U.S. patent application entitled "Lidar Sensor System With a Tunable Optical Filter", application Ser. No. 18/166,259, filed Feb. 8, 2023, assigned to the same assignee, and incorporated herein by reference in its entirety.

BACKGROUND INFORMATION

1. Field

The present disclosure relates generally to sensors and in particular, to a method, apparatus, and system, and computer program product for detecting parameters for an aircraft using a laser sensor system.

2. Background

Laser-based sensor systems can replace many vital aircraft instruments and add new capabilities for aircraft. For example, a light detection and ranging (LIDAR) sensor can be used to measure the speed of an aircraft. With a LIDAR sensor, a laser beam is emitted into the air. The laser beam encounters aerosols in the air that reflect or "backscatter" light towards the aircraft. Aerosols are fine solid particles, liquid particles, or both, suspended in air or other gases. The backscatter of the laser beam can also be caused by the molecules of air.

The backscatter light generated in response to emitting the laser beam is detected. The speed of the aircraft can be determined by comparing the frequency of the laser beam to the frequency in the backscatter. This shift in frequency is a Doppler effect that can be used to calculate the speed of the aircraft. These types of laser-based sensor systems can also be used to measure other parameters such as temperature and air density.

SUMMARY

An embodiment of the present disclosure provides a method for sensing air. A projected component of a laser radiation is emitted as a set of laser beams into an atmosphere from an aircraft. A backscatter light generated in response to said emitting the set of laser beams into the atmosphere is received to form a received backscatter light. The received backscatter light is filtered using a tunable optical filter system to form a filtered backscatter light. A control component derived from the laser radiation is filtered using the tunable optical filter system to form a filtered reference light. A set of parameters is determined for the aircraft using the filtered backscatter light and the filtered reference light.

An embodiment of the present disclosure provides a laser sensor system comprising a laser beam generator, a receiver, a tunable optical filter, a detection system, and an analyzer. The laser beam generator is configured to emit a projected component of a laser radiation as a set of laser beams into an atmosphere from an aircraft. The receiver is configured to receive a backscatter light generated in response to emitting the set of laser beams into the atmosphere to form a received backscatter light. The tunable optical filter system is configured to (1) filter the received backscatter light to form a filtered backscatter light and (2) filter a control component derived from the laser radiation to form a filtered reference light. The detection system is configured to (1) generate backscatter light data in response to detecting the filtered backscatter light and (2) generate reference light data in response to detecting the filtered reference light. The analyzer is configured to determine a set of parameters for the aircraft using the backscatter light data and the reference light data.

Yet another embodiment of the present disclosure provides a method for sensing air. A laser radiation is generated with a fixed laser. The laser radiation is split into a projected component and a control component. The control component is converted into one or more electronic control signals. The projected component is projected into the air to induce scattered radiation. A portion of the scattered radiation is received as backscattered radiation. The backscattered radiation is converted into one or more electronic backscattered radiation signals, including converting a first portion of the backscattered radiation to an unfiltered backscattered electronic signal, filtering at least a second portion of the backscattered radiation using a tunable optical filter to form a filtered portion. The filtered portion is converted to a filtered backscattered electronic signal. The one or more electronic control signals and the one or more electronic backscattered radiation signals are processed to determine a set of parameters.

Still another embodiment of the present disclosure provides a system for optically sensing air data, the system comprising a fixed laser, at least one beam splitter, at least one tunable optical filter, at least one control component detector, an apparatus, at least one backscattered radiation detector, and a control and computing apparatus. The fixed laser generates a laser radiation. The at least one beam splitter is configured to split the laser radiation into a projected component and a control component. The at least one control component detector is coupled to receive at least a portion of the control component through the at least one tunable optical filter. The at least one tunable optical filter is configured to sweep a wavelength of the control component and generate an electronic control signal therefrom. The apparatus is configured to project the projected component into the air to induce scattered radiation and to receive a portion of the scattered radiation as backscattered radiation. The at least one backscattered radiation detector coupled to receive at least a portion of the backscattered radiation through the at least one tunable optical filter. The at least one tunable optical filter is configured to sweep a wavelength of the backscattered radiation and generate an electronic backscattered radiation signal. The control and computing apparatus is configured to sweep a wavelength of the control component and a wavelength backscattered radiation filtered by the tunable optical filter; receive the electronic backscatter signal and the electronic control signal; and determine a set of parameters.

Further, another embodiment of the present disclosure provides a method for determining a linewidth for a laser light. The laser light is received. The laser light is filtered using a tunable optical filter system to form a filtered laser light. The filtered laser light is detected to generate laser light data. A laser linewidth is determined for the laser light using the laser light data filtered reference light.

Still another embodiment of the present disclosure provides a laser sensor system comprising a laser beam generator, a receiver, a tunable optical filter system, a detection system, and an analyzer. The laser beam generator is configured a generate a laser light. The tunable optical filter system is configured to filter the laser light form a filtered laser light.

The detection system is configured to generate laser light data in response to detecting the filtered laser. The analyzer is configured to determine a laser linewidth for the laser light using the laser light data filtered reference light.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of a flowchart of a process for sensing air in accordance with an illustrative embodiment;

FIG. 17 is an illustration of a flowchart of a process for detecting objects relative to the vehicle in accordance with an illustrative embodiment;

FIG. 24 is an illustration of a flowchart of a process for determining a laser linewidth for a laser light in accordance with an illustrative embodiment;

FIG. 25 is an illustration of a flowchart of a process for determining a movement of an object relative to the vehicle in accordance with an illustrative embodiment;

DETAILED DESCRIPTION

Figure 1:
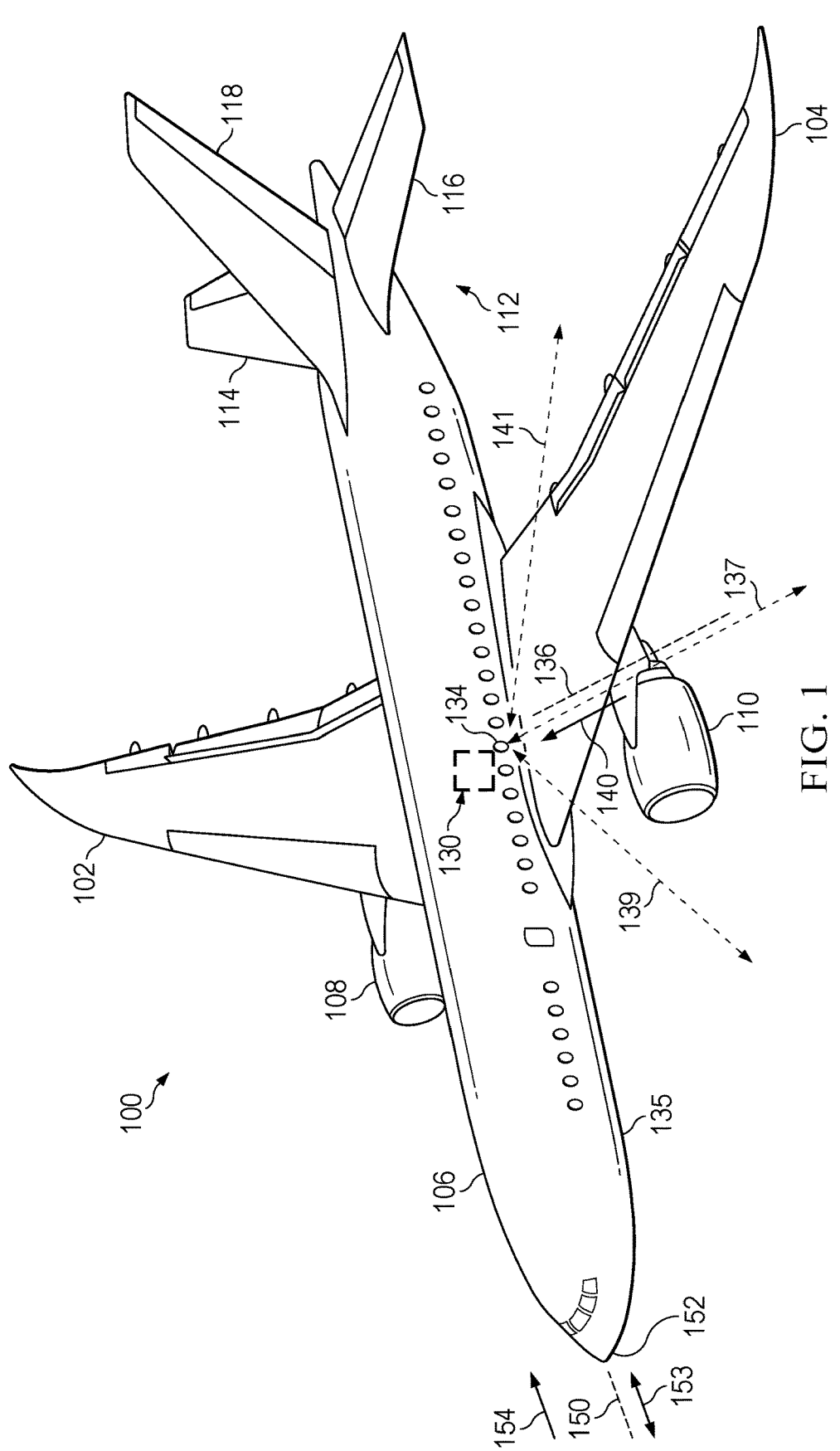
FIG. 1 is an illustration of an aircraft in accordance with an illustrative embodiment.

The illustrative embodiments recognize and take into account one or more different considerations. One type of currently known laser-based sensor system performs wavelength scanning of the laser beam. This wavelength scanning is performed using a tunable laser that can scan through different wavelengths of light. The emission of this laser beam that scans through a range of frequencies results in backscatter that returns in a range of frequencies. This backscatter light resulting from scanning the laser beam can be used to measure parameters for an aircraft. These parameters include, for example, speed, temperature, and air density.

The illustrative embodiments recognize and take into account that aircraft safety concerns are present with respect to laser-based sensor systems. Still other illustrative embodiments recognize and take into account that it is undesirable to have laser beams using light in the visible wavelength spectrum. Laser beams using visible light and near infrared light can result in undesired effects on the eyes of various human operators and people that may be in the vicinity of the aircraft. Infrared and ultraviolet light is absorbed in the water of the eye without resulting in undesired effects.

As a result, a laser system that can scan through different wavelengths to make measurements is more difficult to implement because of a more limited selection of scanning laser systems as compared to fixed laser systems. Many currently available laser systems are unable to scan through the desired wavelengths for eye safety such as infrared or ultraviolet light. Further, the designs for laser systems that scan through desired wavelengths can result in larger than desired footprints for the laser sensor system.

The illustrative embodiments recognize and take into account that a solution can involve using a tunable optical filter that scans through different wavelengths and using a fixed laser. A laser beam emitted from a fixed laser can have a center wavelength within a range of wavelengths. For example, the range of wavelengths can include hundreds of wavelengths. A tunable optical filter can be used to pass different wavelengths in the range of wavelengths through scanning or changing the wavelength or wavelengths that the tunable optical filter passes. This configuration is in contrast to a tunable laser using a bandpass filter that can pass frequencies scanned by the tunable laser.

Thus, using a tunable optical filter with a fixed laser can reduce safety issues while providing desired performance in measuring parameters for an aircraft. Further, with the use of a tunable optical filter and removing a need for a tunable laser, a wider selection of lasers is available for selection when a fixed laser that emits laser beam with a fixed wavelength is used.

In the illustrative examples, a method, an apparatus, a system, and a computer program product are provided for sensing air. A projected component of a laser radiation is emitted as a set of laser beams into an atmosphere from an aircraft. A backscatter light, generated in response to said emitting the set of laser beams into the atmosphere, is received to form a received backscatter light. The received backscatter light is filtered using a tunable optical filter system to form a filtered backscatter light. A control component derived from the laser radiation is filtered using the tunable optical filter system to form a filtered reference light. A set of parameters is determined for the aircraft using the filtered backscatter light and the filtered reference light. In some illustrative examples, the filtered backscatter light can be used to determine the the set of parameters without using the filtered reference light.

With reference now to the figures, and in particular, with reference to FIG. 1, an illustration of an aircraft is depicted in accordance with an illustrative embodiment. In this illustrative example, commercial airplane 100 has wing 102 and wing 104 attached to body 106. Commercial airplane 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Commercial airplane 100 is an example of an aircraft in which laser sensor system 130 can be used to detect a set of parameters. In this illustrative example, laser sensor system 130 can operate to emit laser beams from window 134 during flight or other movement of commercial airplane 100. Laser sensor system 130 can detect backscatter light 140 generated in response to emitting these laser beams.

In this depicted example, laser sensor system 130 emits laser beam 136 from window 134 on port side 135 of commercial airplane 100. Backscatter light 140 is generated in response to emitting laser beam 136. In this example, backscatter light 140 is detected by laser sensor system 130. In this depicted example, backscatter light 140 is used to determine parameters such as the speed of commercial airplane 100.

In another illustrative example, laser beam 136 can be emitted along other axes in addition to axis 137. For example, laser beam 136 can be emitted along second axis 139 and third axis 141. Backscatter light 140 can be detected returning along these axes.

In other illustrative examples, a laser beam can be emitted along other numbers of axes. For example, a laser beam can be emitted along 5 axes, 8 axes, or some other number of actions depending on the particular implementation. By emitting laser beam 136 along multiple axes, a speed of commercial airplane 100 and the direction of travel of commercial airplane 100 can also be determined. The speed and direction of travel can be the velocity of commercial airplane 100.

In another illustrative example, laser beam 150 can be emitted from nose 152 of commercial airplane 100 along axis 153 in place of or in addition to laser beam 136. Backscatter light 154 can be detected in response to emitting laser beam 150. Backscatter light 154 can also be used to determine parameters for commercial airplane 100.

In other illustrative examples, other types of laser sensor systems can be used with commercial airplane 100 in addition to or in place of laser sensor system 130. For example, other laser sensor systems can be implemented to detect other parameters for commercial airplane 100 such as an angle of sideslip, an angle of attack, a temperature, an air density, or other parameters that can be detected using a laser sensor system.

As another example, laser sensor system 130 can detect a parameter, such as a presence of objects like a group or flock of birds that are in the vicinity of commercial airplane 100. In this illustrative example, laser sensor system 130 can detect the presence of a group of birds while commercial airplane 100 is in flight. As another example, the presence of the group of birds can be detected with commercial airplane 100 on the ground.

As another example, a laser beam can be emitted from commercial airplane 100 from other locations in addition to or in place of port side 135 and nose 152 of commercial airplane 100. For example, a laser beam can be emitted from starboard side 133 or tail section 112 of commercial airplane 100.

Figure 2:
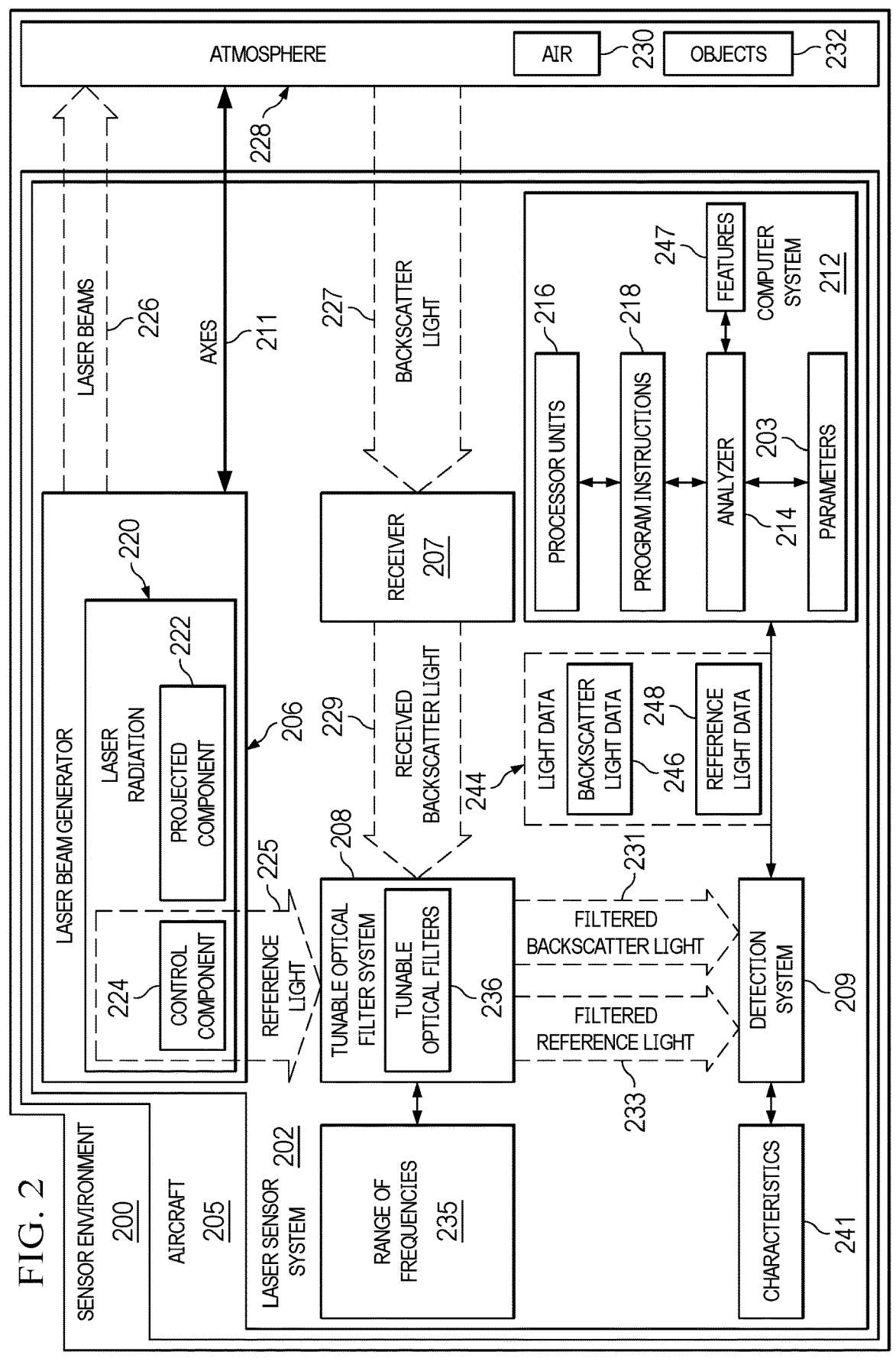
FIG. 2 is an illustration of a block diagram of a sensor environment in accordance with an illustrative embodiment.

With reference now to FIG. 2, an illustration of a block diagram of sensor environment is depicted in accordance with an illustrative embodiment. In this illustrative example, sensor environment 200 is an environment in which a set of parameters 203 for aircraft 205 can be detected using a laser system in the form of laser sensor system 202.

As used herein, a "set of" when used with reference items means one or more items. For example, set of parameters 203 is one or more of parameters 203. In this illustrative example, set of parameters 203 can be selected from at least one of a speed, a direction of travel, a temperature, air density, an angle of sideslip, an angle of attack, a presence of a group of objects, or other suitable parameters for aircraft 205 that can be detected from sensing at least one of air 230 or objects 232 in atmosphere 228. In this illustrative example, the objects are solid objects that can be least one of a bird, a flock of birds, an aircraft, debris, an antenna, a vehicle, a building, a person, or other type of object may be in a location relative to aircraft 205 while aircraft 205 is in flight, moving on the ground, or stationary on the ground.

In this illustrative example, a "group of" when used with reference to items means one or more items. For example, a group of objects is one or more objects. In this illustrative example, the group of objects can be a group of birds or other objects.

Commercial airplane 100 in FIG. 1 is an example of one implementation for aircraft 205. Aircraft 205 can be selected from a group comprising one of a commercial aircraft, a commercial airplane, a tilt-rotor aircraft, a tilt wing aircraft, a vertical takeoff and landing aircraft, an electrical vertical takeoff and landing aircraft, a personal air aircraft, a military aircraft, a fighter jet, and other types of aircraft.

In this illustrative example, laser sensor system 202 comprises laser beam generator 206, receiver 207, tunable optical filter system 208, detection system 209, and analyzer 214.

In this illustrative example, laser beam generator 206 can operate without scanning or changing wavelengths. Laser beam generator 206 can be implemented using a fixed laser beam generator.

As depicted, laser beam generator 206 generates laser radiation 220. Laser beam generator 206 can split laser radiation 220 into projected component 222 and control component 224.

In this example, control component 224 can be sent to tunable optical filter system 208 as reference light 225. As depicted, projected component 222 can be emitted as a set of laser beams 226 into atmosphere 228 from aircraft 205.

Backscatter light 227 is generated in response to laser beam generator 206 emitting the set of laser beams 226 into atmosphere 228. Backscattering is the reflection of a laser beam to the direction from which the laser beam originated. The backscattering can be from a diffuse reflection due to scattering in air 230.

In response to emitting the set of laser beams 226 into atmosphere 228, set of laser beams 226 can be scattered by at least one of air 230 or objects 232 in atmosphere 228. Objects 232 can be, for example, a group of birds. In this illustrative example, air 230 comprises air molecules. Air 230 can also include water droplets, dust, and other particles suspended in air 230.

In this illustrative example, receiver 207 receives backscatter light 227. Receiver 207 is a hardware system and can include optical components that can receive backscatter light 227.

In one illustrative example, receiver 207 can be implemented using a telescope, which contains optical components that can both receive and transmit light. For example, the telescope can also be used by laser beam generator 206 to transmit the set of laser beams 226.

In this illustrative example, tunable optical filter system 208 contains a set of tunable optical filters 236. A tunable optical filter is a hardware device that can pass wavelengths of light. The tunable optical filter can be controlled to select or scan through different wavelengths of light that are passed through the optical filter. A tunable optical filter can be, for example, a scanning atomic line filter such as a potassium atomic resonance filter.

In this illustrative example, tunable optical filter system 208 receives control component 224 of laser radiation 220 as reference light 225 from laser beam generator 206. Additionally, tunable optical filter system 208 receives received backscatter light 229 from receiver 207.

Tunable optical filter system 208 filters received backscatter light 229 to form filtered backscatter light 231. Additionally, tunable optical filter system 208 filters a control component derived from the laser radiation using a tunable optical filter system to form a filtered reference light 233. In this example, tunable optical filter system 208 is configured to sweep over a range of frequencies 235 in filtering received backscatter light 229 to form filtered backscatter light 231 and sweep over range of frequencies 235 in filtering control component 224 derived from laser radiation 220 to form filtered reference light 233.

As depicted, tunable optical filter system 208 is optically coupled to detection system 209. Tunable optical filter system 208 can send filtered backscatter light 231 and filtered reference light 233 to detection system 209 for measurement.

In this example, detection system 209 is a hardware system that includes components that detect filtered backscatter light 231 and filtered reference light 233. Additionally, detection system 209 can also include hardware and software components that generate data from measuring the detected light. In addition, detection system 209 can measure a set of characteristics 241 for filtered reference light 233 and filtered backscatter light 231. The set of characteristics 241 can include at least one of a signal strength, a polarization, a wavelength, a frequency, an intensity, or other characteristics of filtered reference light 233 and filtered backscatter light 231 that can be used to generate light data 244. Light data 244 can be encoded in electrical or optical signals that are sent to analyzer 214 in computer system 212 for analysis.

In this example, detection system 209 generates backscatter light data 246 in light data 244 from filtered backscatter light 231. Detection system 209 also generates reference light data 248 in light data 244 from filtered reference light 233.

As depicted, detection system 209 is connected to computer system 212 and in communication with analyzer 214 in computer system 212. The communications can be performed using at least one of electrical signals using a wired connection or optical signals using an optical connection. Detection system 209 can send backscatter light data 246 and reference light data 248 to analyzer 214.

In this example, analyzer 214 can be implemented in software, hardware, firmware or a combination thereof. When software is used, the operations performed by analyzer 214 can be implemented in program instructions configured to run on hardware, such as a processor unit. When firmware is used, the operations performed by analyzer 214 can be implemented in program instructions and data and stored in persistent memory to run on a processor unit. When hardware is employed, the hardware can include circuits that operate to perform the operations in analyzer 214.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium may be a network. The data processing systems may be selected from at least one of a computer, a server computer, a tablet, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in a computer system 212. Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, analyzer 214 determines a set of parameters 203 for aircraft 205 using filtered backscatter light 231 and filtered reference light 233. In this example, analyzer 214 uses filtered backscatter light 231 and filtered reference light 233 by analyzing characteristics 241 of filtered backscatter light 231 and filtered reference light 233 using backscatter light data 246 and reference light data 248 in light data 244 generated by detection system 209.

In this example, laser sensor system 202 can be a light detection and ranging (LIDAR) system and can also be referred to as a LIDAR sensor system.

In this illustrative example, in determining the set of parameters 203, analyzer 214 determines a set of features 247 using at least one of backscatter light data 246 or reference light data 248. Analyzer 214 determines the set of parameters 203 for aircraft 205 using the set of features 247.

In this illustrative example, the set of features 247 can take a number of different forms. For example, the set of features 247 can be a frequency difference between a first minimum signal strength for filtered reference light 233 and a second minimum signal strength for filtered backscatter light 231. The set of features 247 can also be a width or distance from a first point for a start in a signal strength reduction for filtered backscatter light 231 from no signal strength change for filtered backscatter light 231 to a second point for a return to no signal strength change for filtered backscatter light 231 after reaching a minimum signal strength for filtered backscatter light 231. In another example, the set of features 247 can be a signal strength difference between a first signal strength of filtered reference light 233 with no changes and a second signal strength of the filtered backscatter light 231 with no changes. The difference can be measured at the same time for the signal strengths.

The set of parameters 203 can take a number of different forms. For example, the set of parameters 203 can be selected from at least one of a speed, a temperature, an air density, an angle of sideslip, an angle of attack, a presence of a group of objects, or some other parameter that can be determined from sensing at least one of air 230, objects 232, and atmosphere 228 using set of laser beams 226 to generate backscatter light 227.

In one illustrative example, one or more technical solutions are present that overcome a technical problem with determining parameters with limitations in selecting lasers that can scan wavelengths with a desired safety use in aircraft. As result, one or more technical solutions are present that enable using a fixed laser and performing the scanning of laser light using a tunable optical filter.

The illustration of sensor environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, laser sensor system 202 can have one or more laser beam generators in addition to or in place of laser beam generator 206. These laser beam generators can be placed in different locations on the aircraft. These locations can include, for example, a portside, a starboard side, a nose, a tail section, a top side, a bottom side, or other location.

In another illustrative example, laser beam generator 206 can also operate to emit the set of laser beams 226 as two or more laser beams along axes 211. In this example, each laser beam is emitted along one of the axes in axes 211. The laser beams can be emitted from the same location for different locations. For example, three laser beams can be emitted along three axes in axes 211 from a first location in aircraft 205. Four laser beams can be emitted from another location on aircraft 205 along for axes in axes 211.

Backscatter light 227 received in response to these different laser beams can enable determining more parameters in the set of parameters 203. For example, in addition to the speed of aircraft 205, the set of parameters can also include a direction of travel for aircraft 205 when laser beams 226 are emitted along multiple axes from a location into atmosphere 228 from the same location as laser beams 226.

Although the illustrative examples are described using laser sensor system 202 with aircraft 205, other illustrative examples can be applied to other types of platforms. The platform can be, for example, a mobile platform, a stationary platform, a land-based structure, an aquatic-based structure, and a space-based structure. More specifically, the platform can be a surface ship, a tank, a personnel carrier, a train, a vehicle, a spacecraft, a space station, a satellite, a submarine, an automobile, a power plant, a bridge, a dam, a house, a manufacturing facility, a building, and other suitable platforms.

Figure 3:
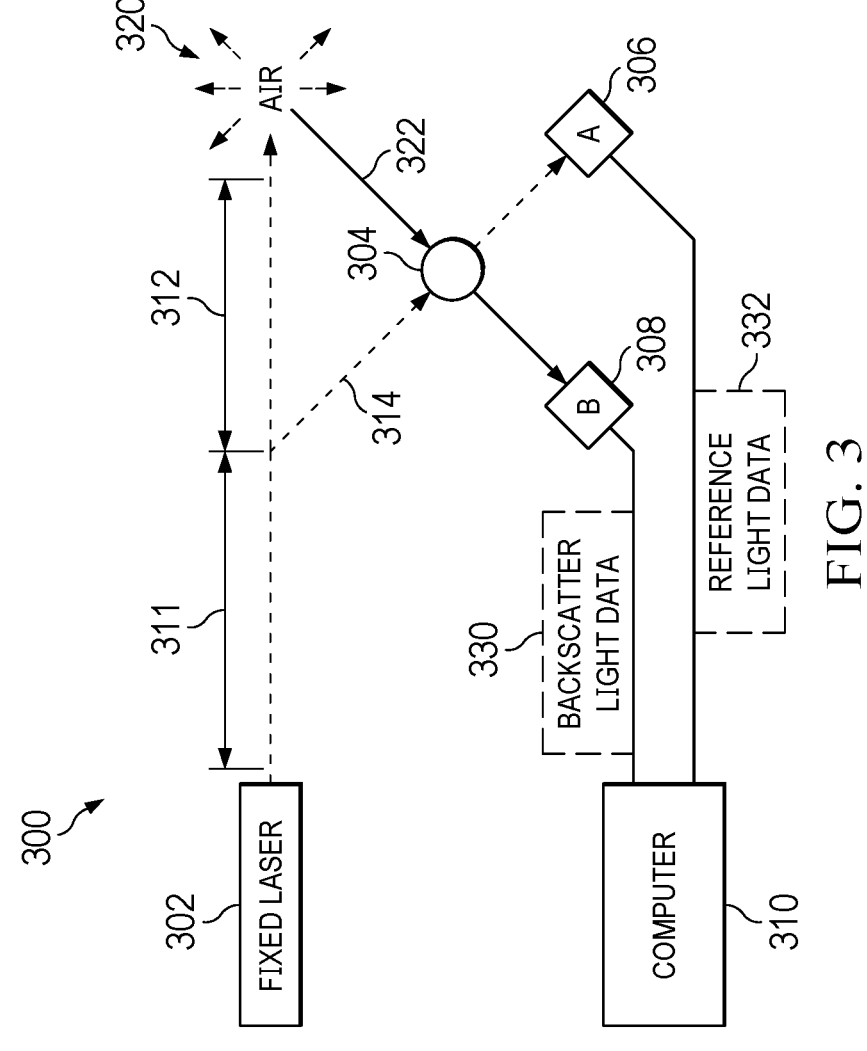
FIG. 3 is an illustration of a laser sensor system in accordance with an illustrative embodiment.

Turning next to FIG. 3, an illustration of a laser sensor system is depicted in accordance with an illustrative embodiment. Laser sensor system 300 is an example of an implementation for laser sensor system 202 shown in FIG. 2. As depicted, laser sensor system 300 comprises fixed laser 302, scanning atomic line filter 304, detector A 306, detector B 308, and computer 310.

In this example, fixed laser 302 is an example of a component in laser beam generator 206 in FIG. 2. Detector A 306 and detector B 308 are examples of detectors in detection system 209 in FIG. 2. Computer 310 is an example of computer system 212 in FIG. 2.

As depicted, fixed laser 302 generates laser radiation 311 that is split into two components, laser beam 312 and reference light 314. The splitting of laser radiation 311 into laser beam 312 and reference light 314 can be performed using an optical system (not shown) comprising at least one of a mirror, a lens, or other components. These components can be part of laser beam generator 206 in FIG. 2.

In this illustrative example, laser beam 312 is emitted into air 320. In this example, air 320 causes scattering of laser beam 312 to form backscatter light 322. Backscatter light 322 is received and directed through scanning atomic line filter 304 to detector B 308. As depicted, reference light 314 is directed through scanning atomic line filter 304 to detector A 306. In this illustrative example, scanning atomic line filter 304 scans through different frequencies to pass different frequencies of light. As a result, the scanning performed by scanning atomic line filter 304 can pass selected frequencies of backscatter light 322 and reference light 314 to detector B 308 and detector A 306, respectively.

These detectors generate signals containing backscatter light data 330 and reference light data 332. This light data can be processed by computer 310 to determine one or more parameters from sensing air 320 using backscatter light 322 generated in response to emitting laser beam 312. These parameters can include at least one of at least one of a speed, a direction of travel, a temperature, air density, an angle of sideslip, an angle of attack, or for other parameters that can be detected from sensing air 320. Air density and temperature can be used to calculate air pressure.

Figure 4:
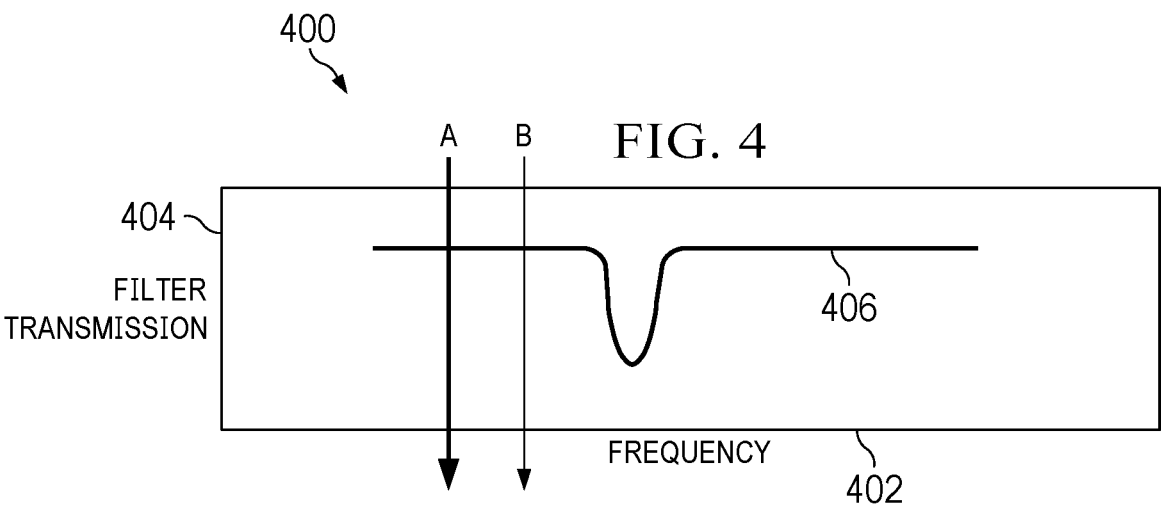
FIG. 4 is an illustration of a filter transmission by a tunable optical filter in accordance with an illustrative embodiment.

Turning next to FIG. 4, an illustration of a filter transmission by a tunable optical filter is depicted in accordance with an illustrative embodiment. Graph 400 illustrates the transmission of backscatter light 322 and reference light 314 by scanning atomic line filter 304. The filtered reference light is detected by detector A 306 and the filtered backscatter light detected by detector B 308 to generate backscatter light data 330 and reference light data 332 in FIG. 3.

In graph 400, x-axis 402 represents frequency and y-axis 404 presents filter transmission. The filter transmission is the amount of light passed by scanning atomic line filter 304. As depicted, filter transmission line 406 depicts the amount of light that is transmitted by scanning atomic line filter 304 for different frequencies scanned by scanning atomic line filter 304.

Figure 5:
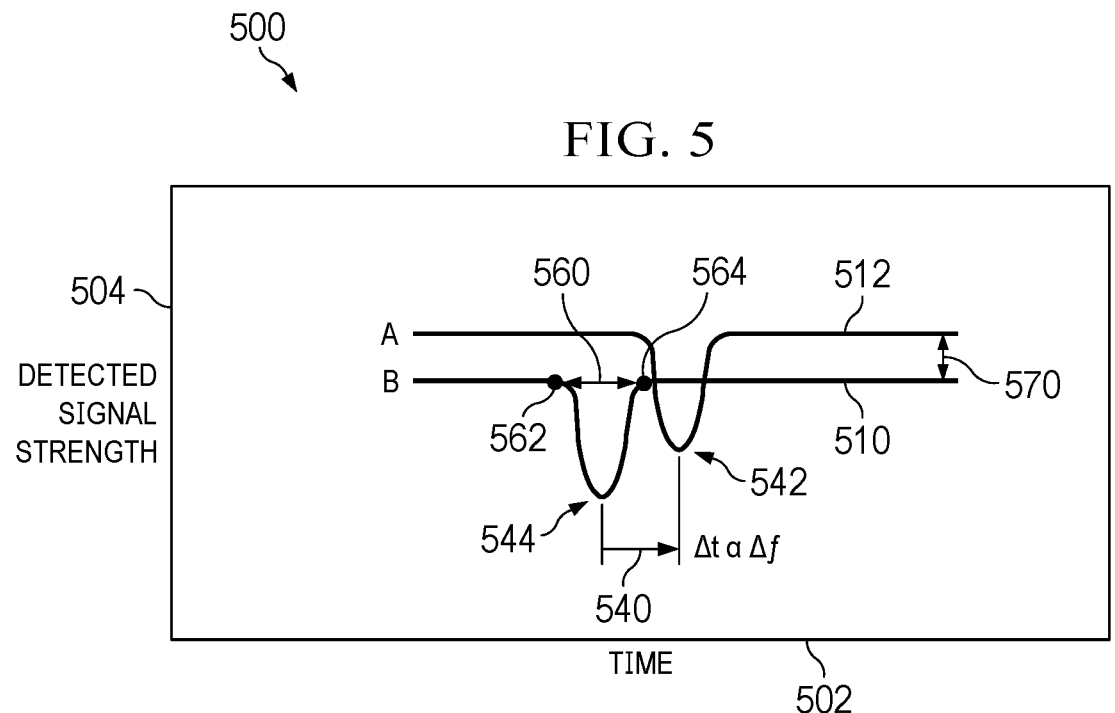
FIG. 5 is an illustration of a detected signal strength for a filtered reference light and a filtered backscatter light in accordance with an illustrative embodiment.

With reference now to FIG. 5, an illustration of detected signal strength for a filtered reference light and a filtered backscatter light is depicted in accordance with an illustrative embodiment. Graph 500 illustrates the detection of filtered backscatter light by detector B 308 and filtered reference light by detector A 306 to generate backscatter light data 330 and reference light data 332 in FIG. 3.

In graph 500, x-axis 502 represents time and y-axis 504 represents signal strength. In this example, the signal strength can be measured as power in watts.

As depicted, backscatter signal strength curve 510 represents the signal strength of backscatter light 322 filtered by scanning atomic line filter 304. Reference signal strength curve 512 represents the signal strength of reference light 314 filtered by scanning atomic line filter 304.

The data represented by graph 500 can be used to determine a set of parameters from sensing air 320 in FIG. 3. For example, difference 540 between first minimum signal strength 542 for the filtered reference light and second minimum signal strength 544 for the filtered backscatter light can be used to determine speed. In this example, difference 540 is a difference in time, which is proportional to the difference in frequency.

As another example, width 560 of the dip to second minimum signal strength 544 for the backscatter light can be used to determine temperature of the air 320. In this example, width 560 is from a first point 562 for a start in a signal strength reduction for the filtered backscatter light from no signal strength change for the filtered backscatter light to second point 564 for a return to no change in the signal strength for the filtered backscatter light after reaching second minimum signal strength 544 for the filtered backscatter light.

As another example, signal strength difference 570 between the flat portion of backscatter signal strength curve 510 and reference signal strength curve 512 can be used to determine air density of air 320. In this example, signal strength difference 570 is between the signal strength of the filtered reference light with no changes in the signal strength in reference signal strength curve 512 and the signal strength of the filtered backscatter light with no changes in backscatter signal strength curve 510.

Figure 6:
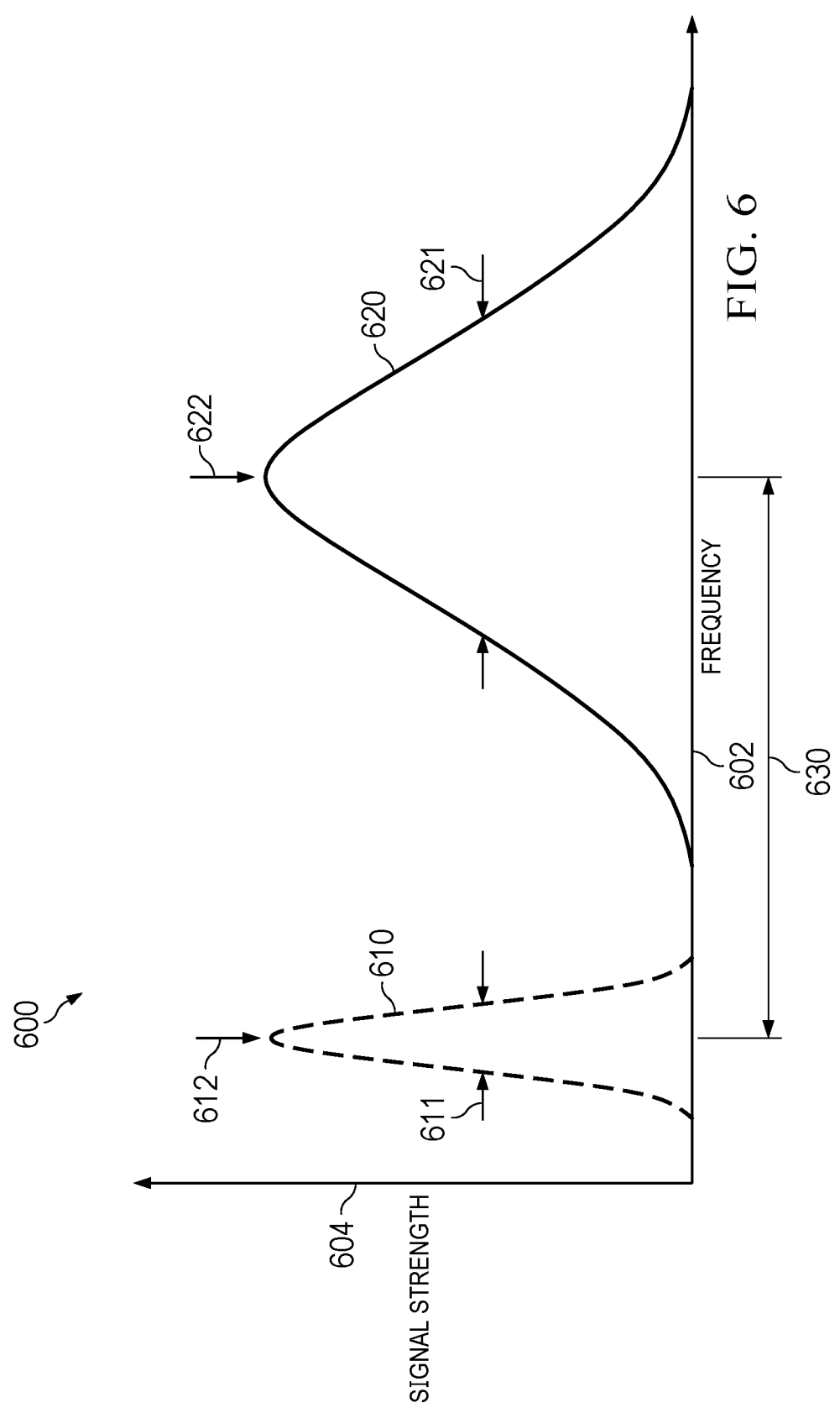
FIG. 6 is an illustration of a laser beam emitted into air and backscatter light scattered by the air in accordance with an illustrative embodiment.

Next with reference to FIG. 6, an illustration of a laser beam emitted into air and backscatter light scattered by the air is depicted in accordance with an illustrative embodiment. In this illustrative example, graph 600 is a graph of signal strength for a laser beam and backscatter light at different frequencies. X-axis 602 represents frequency and y-axis 604 represents signal strength. In this illustrative example, the signal strength can be measured as power in watts.

In this illustrative example, a laser beam is transmitted into air. The signal strength for the laser beam is represented by curve 610. In this example, a laser spectrum has a width 611. The laser spectrum is a continuous range of frequencies for the laser light in the laser beam. In this example, the measurement for the laser spectrum is made as a full width at half maximum (FWHM). This measurement corresponds to the distance between the two points closest to the peak that have 50% of the maximum irradiance or intensity. In this example, the center wavelength of the laser beam has the highest signal strength at point 612 in curve 610.

In response to emitting the laser beam into air, backscatter light is detected. This backscatter light is a portion of the laser beam that is scattered back in the direction of transmission in this illustrative example.

The signal strength for this backscatter light is represented by curve 620. The laser spectrum received for the backscatter light has width 621. The laser spectrum for the backscatter light is a continuous range of frequencies for the scattered laser light that forms the backscatter light. The center wavelength of the backscatter light is at the highest signal strength at point 622 in curve 620.

As depicted, width 621 for the laser spectrum of the backscatter light is greater than width 611 of the laser spectrum for the laser beam. The scattering of the laser beam in the air by air molecules and other suspended particles results in a spread in the laser spectrum.

In this illustrative example, the emission of a laser beam into air results in a shifting frequency of the laser spectrum. As depicted, peak shift 630 is a shifting of the frequency from point 612 to point 622. This shift can be a Doppler shift and can be used to determine the speed of the aircraft.

Figure 7:
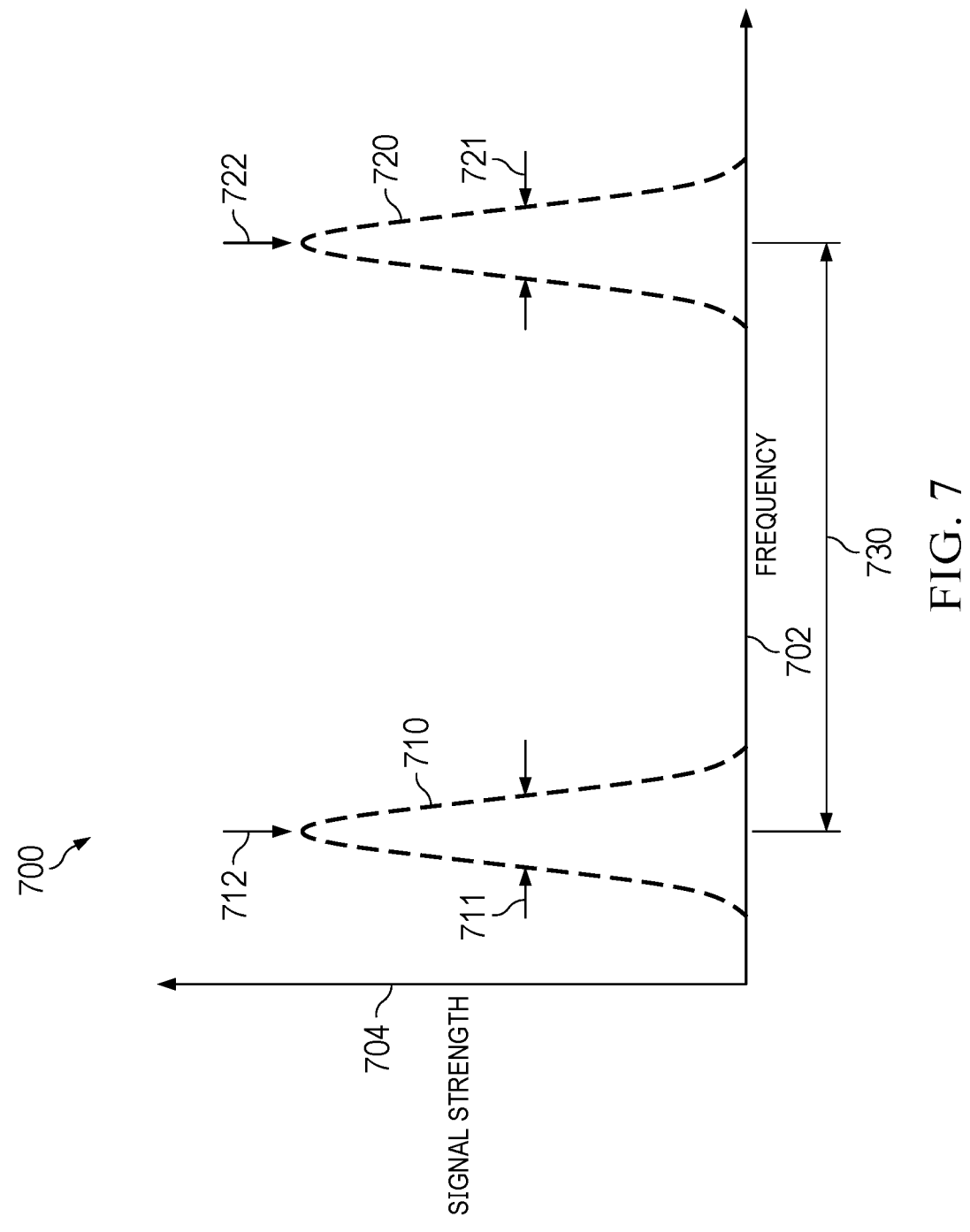
FIG. 7 is an illustration of a laser beam emitted at a group of birds and backscatter light scattered by the group of birds in accordance with an illustrative embodiment.

Turning now to FIG. 7, an illustration of a laser beam emitted at a group of birds and backscatter light scattered by the group of birds is depicted in accordance with an illustrative embodiment. In this illustrative example, graph 700 is a graph of signal strength for a laser beam and backscatter light at different frequencies. X-axis 702 represents frequency and y-axis 704 represents signal strength. The signal strength can be measured as power in watts.

In this illustrative example, a laser beam is transmitted into air. The signal strength for the laser beam is represented by curve 710. In this example, the laser spectrum for the laser light of the laser beam has width 711. The laser spectrum is a continuous range of frequencies for the laser light in the laser beam. In this example, the center wavelength of the laser beam has the highest signal strength at point 712 in curve 710.

In this example, the emitted laser beam encounters a group of birds and is scattered by the group of birds. This scattering results in detecting backscatter light.

The signal strength for this backscatter light is represented by curve 720. The laser spectrum for the received backscatter light has width 721. The laser spectrum for the backscatter light is a continuous range of frequencies for the scattered laser light that forms the backscatter light. The center wavelength of the backscatter light is at the highest signal strength at point 722 in curve 720.

As depicted, width 721 for the laser spectrum of the backscatter light is about the same as width 711 of the laser spectrum for the laser beam. The scattering of the laser beam in the air by birds does not create as much of a spread in the laser spectrum as compared to scattering of the laser beams by air. As a result, a determination can be made, based on the amount spread, as to when objects such as birds are detected. Further, the signal strength can be used to determine the size of the objects. In this illustrative example, the size of the object is proportional to the signal strength.

As depicted, the emission of a laser beam into air results in a shifting frequency of the laser spectrum. As depicted, peak shift 730 is a shifting frequency from point 712 to point 722. This shift can be a Doppler shift and can be used to determine the presence of objects such as birds. Further, this Doppler shift can also be used to determine the speed difference between the birds and the aircraft.

Thus, the frequency shift can be used to determine the speed of the birds relative to the aircraft. For example, if the center wavelength at point 722 in curve 720 for the backscatter light shifts relative to center wavelength at point 712 in curve 710 for laser beam, the birds may be moving toward or away from the aircraft depending on what direction the center frequency of the backscatter light at point 722 shifts relative to the center frequency of the laser light at point 712.

For example, if the frequency shift represented by peak shift 730 increases, the birds are moving toward the aircraft. If the frequency shift represented by peak shift 730 decreases, the birds are moving away from the aircraft.

In one example, the bird flight direction can be determined by shifting the frequency (i.e., wavelength) of the reference laser beam by a few dozen MHz using an acousto-optic modulator and using those measurements to determine the direction that the birds are moving relative to the aircraft.

In another example, the frequency shift can be determined as the aircraft changes speed for determining whether the birds are moving toward or away from the aircraft. For example, as the aircraft increases speed, the corresponding frequency shift is G. As the aircraft reduces speed, the corresponding frequency shift is H. If G is greater than H, the birds are moving toward the aircraft. If G is not greater than H, the birds are moving away from the aircraft.

In yet another example, the rate of change in the backscatter signal strength can be used to determine the movement of an object relative to the aircraft. In this example, the signal strength can be a measurement of power for the received backscatter light.

For example, if aircraft approaches a stationary reflective object, the rate of change in the backscatter signal is K. If the object starts to move toward the aircraft, the rate of change in the backscatter signal strength increases to a value greater than K. If the object moves away from the aircraft, the backscatter signal strength rate of change becomes less than K. In this example, this rate of change is a time based rate of change in the signal strength.

Additionally, the size of the group of birds can also be determined based on the change in the width of the frequency spectrum.

In these illustrative examples, when laser sensor system 202 operates to emit a laser beam into air to determine parameters from sensing air, laser sensor system 202 operates as a LIDAR sensor system. The operation of laser sensor system 202 operates as an object lidar when laser sensor system 202 emits a laser beam to detect objects.

Thus, FIG. 6 and FIG. 7 illustrate that laser sensor system 202 can operate to determine whether the laser beam is scattered by air or by a group of objects based on the amount of spread in the width of the laser spectrum of the laser and the width of the laser spectrum for the backscatter light. The amount of spread can be determined using various techniques. For example, empirical data from testing the laser beam on air and different types of objects can be used. As another example, models can be used to determine whether the change in the width of the laser spectrum indicates the presence of an object rather than air.

Further, laser sensor system 202 can be implemented in other types of vehicles, in addition to or in place of aircraft, to determine the presence of objects. For example, the process in this example can be used to determine the presence of objects relative to ground vehicles such as automobiles, trucks, buses, trains, or other types of vehicles. In one illustrative example, laser sensor system 202 can be implemented in an autonomous vehicle to detect the presence of objects relative to the autonomous vehicle. These objects can be, for example, selected from at least one of another vehicle, debris, a curb, a pedestrian, a bicycle, or other objects. This autonomous vehicle can be an autonomous ground vehicle such as, for example, an automobile, a truck, a semi-trailer truck, a forklift, or some other vehicle that can operate autonomously.

The detection of the presence of objects, as well as other parameters for those objects, can be used to operate the autonomous vehicle. For example, depending on the location of the objects detected, collisions can be avoided as well as other operations. For example, if the autonomous vehicle is a forklift, the forklift can operate to engage and lift a pallet.

In another illustrative example, laser sensor system 202 can also operate to measure a laser linewidth for laser light. The laser light can be for a laser beam or backscatter light. The laser line is a frequency span of the laser radiation.

For example, the laser linewidth can be the width of the power spectral density of the emitted electric field in terms of frequency. A laser linewidth can be, for example, 100 kHz or less at any moment. The determination of the laser linewidth can be used as a diagnostic feature in laser sensor system 202. The determination of laser linewidth for a set of laser beams 226 can be used to determine whether laser beam generator 206 is operating within a desired tolerance.

Figure 8:
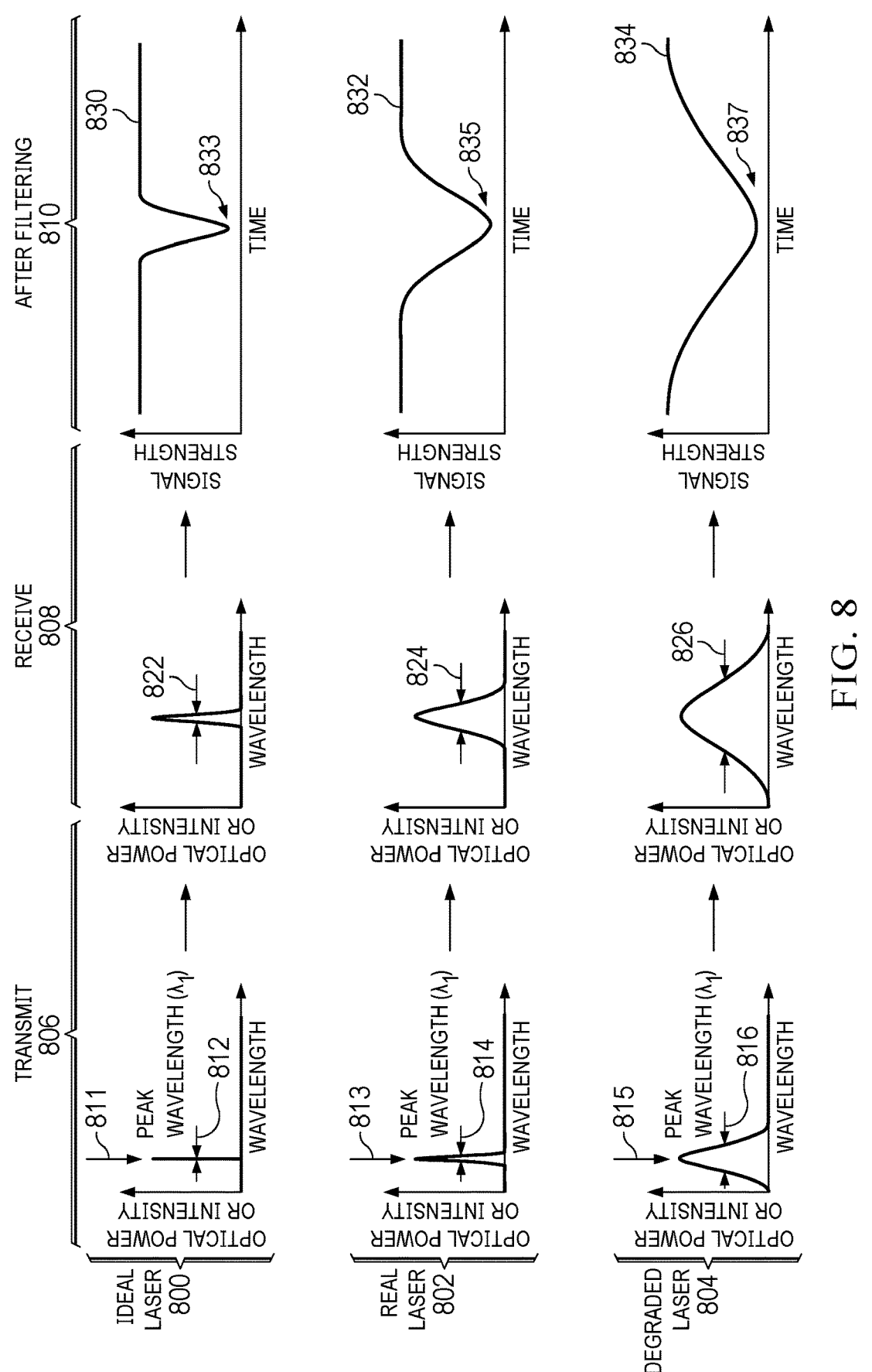
FIG. 8 is an illustration of states of laser beam light for a laser linewidth determination of a laser beam in accordance with an illustrative embodiment.

With reference to FIG. 8, an illustration of states of a laser beam light for a laser linewidth determination of a laser beam is depicted in accordance with an illustrative embodiment. In this illustrative example, laser light for a laser beam goes through states that change the laser spectrum for the laser light.

In this illustrative example, laser light is described for ideal laser 800, real laser 802, and degraded laser 804. The laser light for these types of lasers can have transmit state 806, receive state 808, and after filtering state 810. In the illustrative example, the characteristics for the lasers in transmit state 806 and receive state 808 are optical power or intensity as a function of wavelength.

The measurements for these lasers in after filtering state 810 are signal strengths as a function of time. In this example, these measurements can be made by detection system 209 after filtering by tunable optical filter system 208 in laser sensor system 202 in FIG. 2.

As depicted in this example, transmit state 806 is a state in which a laser beam is transmitted. In this state, ideal laser is a laser beam transmitted with peak wavelength 811 and laser spectrum 812 that has spectral width that is about zero. Real laser 802 in transmit state 806 is a laser beam with peak wavelength 813 and laser spectrum 814. In this example, laser spectrum 814 has a finite spectral width. As depicted, degraded laser 804 is a laser beam transmitted with peak wavelength 815 and laser spectrum 816. As depicted, these laser spectrums are the laser linewidths for the different lasers.

In this illustrative example, peak wavelength 811 for ideal laser 800, peak wavelength 813 for real laser 802, and peak wavelength 815 for degraded laser 804 are all the same wavelength. As depicted, laser spectrum 814 for real laser 802 is greater than laser spectrum 812 for ideal laser 800. Further, laser spectrum 816 for degraded laser 804 is greater than laser spectrum 814 for real laser 802.

Receive state 808 is a state in which the laser light in the laser beam in transmit state 806 is received. The light received can be a control component that is received as a reference light prior to filtering using the tunable optical filter system. In another example, the light received can be backscatter light resulting from backscattering of the laser beam.

In receive state 808, the backscatter light from ideal laser 800 has laser spectrum 822. This laser spectrum is broader than laser spectrum 812 or when ideal laser 800 was transmitted. The spread in laser spectrum 822 is different due to the scattering of the laser beam.

Additionally, in receive state 808, the backscatter for real laser 802 has laser spectrum 824. This laser spectrum is broader than laser spectrum 814 for the laser light emitted by real laser 802. Backscatter light for degraded laser 804 has laser spectrum 826. This laser spectrum is greater than laser spectrum 816 for the laser beam emitted by the degraded laser 804. As can be seen in this example, the backscatter light for degraded laser 804 has a greater laser spectrum than the backscatter light for real laser 802.

In after filtering state 810, measurements of signal strength as a function of time are shown for the different lasers. Curve 830 for ideal laser 800 has a dip with minimum 833. Curve 832 for real laser 802 has a dip with minimum 835, and curve 834 for degraded laser 804 has a dip with minimum 837.

In this example, the laser linewidth for a laser beam can be determined by comparing the signal strength generated from detecting the filtered laser light in after filtering state 810 with historical data from previously made measurements for lasers with known characteristics for laser linewidths. This laser light can be the control component that is received as a reference light. The historical data can be previously recorded curves from after filtering or can include historical measurements that can be used to perform curve fitting.

For example, the measurements for real laser 802 and degraded laser 804 can be compared with prior measurements of signal strength versus time. These prior measurements can be for known laser linewidths. In this illustrative example, if the air temperature is known from the prior measurements and for the current measurements, the width of the measured curves in after filtering state 810 can indicate the amounts of laser degradation.

As another example, the measurements represented by curve 832 for real laser 802 in after filtering state 810 can be compared with historical data for lasers beam generators of the same type or model. These laser beam generators also have the same configuration or settings in this illustrative example.

These signal strength curves can be compared to historical data for laser generators of the same type with corresponding configurations for settings. In addition, these curves can be used to determine the laser linewidth, which is the laser spectrum for the laser light being analyzed. As result, the laser spectrum can be determined in addition to determining whether the laser spectrum is within a desired range for the laser generator.

Figure 9:
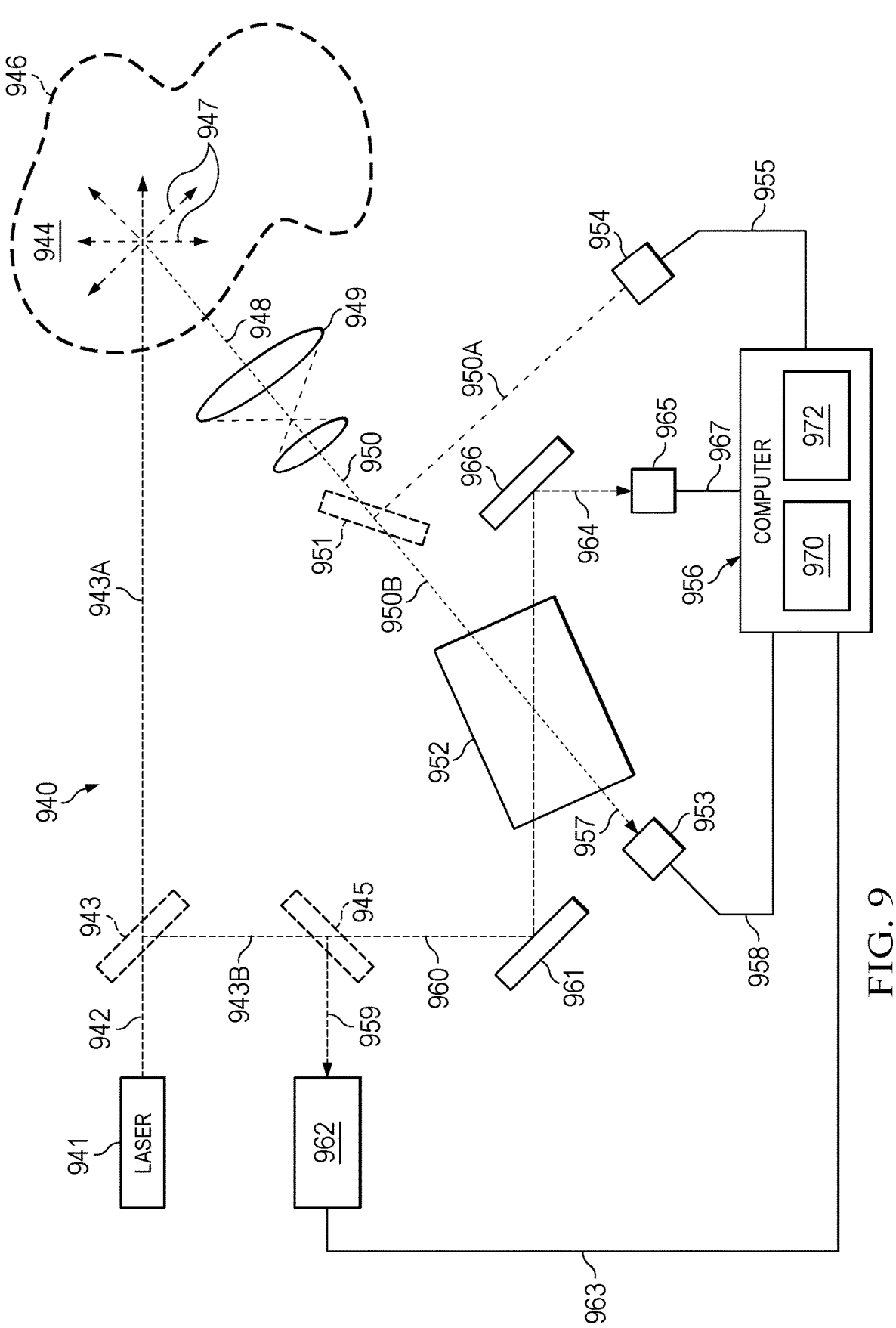
FIG. 9 is an illustration of an optical air data system in accordance with an illustrative embodiment.

Turning now to FIG. 9, an illustration of an optical air data system is depicted in accordance with an illustrative embodiment. In this figure, optical air data system (OADS) 940 is an example of a laser sensor system that can be used to implement laser sensor system 202 in FIG. 2. OADS 940 can be used for determining air parameters based upon laser radiation backscattered from both air molecules and aerosols. Examples of such air parameters include air speed, air pressure, air temperature and/or aircraft orientation angles relative to the local wind. OADS 940 may be configured with other aircraft as well, including unmanned air vehicles (UAVs), helicopters, missiles, gliders and space shuttles.

In this embodiment, OADS 940 includes fixed laser 941 configured for generating laser radiation 942. Fixed laser 941 has a center wavelength and does not intentionally change in this example. Some unintentional change or drift in the center wavelength can occur during operation of fixed laser 941. As depicted, center wavelength can be about 253.7 nm, although other wavelengths may be used when using other fixed lasers. In this example, the fixed laser is a laser generator that does not scan or change wavelengths during operation of the laser.

For example, fixed laser 941 may be a frequency quadrupled, Nd:YAG (i.e., neodymium:yttrium-aluminum-garnet) pumped Ti:Sapphire (titanium-sapphire) laser. Alternatively, frequency-quadrupled Yb-doped (ytterbium-doped) fiber lasers may be used that offer important benefits of smaller size, lighter weight, increased robustness and improved reliability, as compared to Nd:YAG-pumped Ti:Sapphire lasers. Alternately, diode lasers, diode laser bars, stacks of diode laser bars, and frequency up-conversion techniques can be used to fabricate the laser.

In the illustrated embodiment, fixed laser 941 radiates laser radiation 942 to beam splitter 943, which splits the beam into two components, 943A and 943B. Component 943A is directed through air 944; component 943B is directed to beam splitter 945.

In particular, component 943A of laser radiation 942 directed to air 944 is scattered into scatter field 946. Scattering of component 943A is illustrated by scattering vectors 947 in scatter field 946, whereas return scattering is illustrated by backscattered laser radiation 948. Component 943B of the laser radiation 942 is used as a reference for comparison to backscattered laser radiation 948. Such a comparison is for example useful in determining air parameters such as air speed, since transmitted and received frequencies of the laser radiation may be ascertained for use in a Doppler equation.

In the illustrated embodiment, backscattered laser radiation 948 is received through optics 949. In one example, optics 949 is a telescope that gathers backscattered laser radiation 948 into a beam 950. Optics 949 also directs beam 950 to beam splitter 951, to split beam 950 into two components 950A/950B. Component 950B of beam 950 passes through scanning atomic line filter 952 to detector 953 to produce electronic signal 958 representative of the component 957 impinging detector 953; whereas component 950A is directed by beam splitter 951 to detector 954.

In this illustrative example, scanning atomic line filter 952 can operate to scan a range of frequencies to filter component 950B and component 960 prior to filtered component 964 being detected by detector 965 and filtered component 957 being detected by detector 953. With the use of scanning atomic line filter 952 to scan and pass different wavelengths and frequencies laser light, the laser generator can be fixed laser 941 rather than using a tunable laser that can change wavelengths during operation. As a result, a greater selection of laser generators may be available without having a requirement that the laser generator be a tunable laser generator.

In this example, when the fixed laser 941 has a center frequency of approximately 1182.5 THz, or c/253.7 nm, where c is the speed of light (approximately $3 \times 10^8$ m/s), scanning atomic line filter 952 can scan frequencies on either side of the center frequency. For example, scanning atomic line filter 952 can be tuned to scan +/−20 GHz about the center frequency.

In one embodiment, detector 954 is a photodetector that receives component 950A and converts it into an electronic signal 955. Detector 954 connects to a computer 956 to process electronic signal 955.

Similarly, detector 953 is a photodetector configured for detecting filtered component 957 received from scanning atomic line filter 952 filtering component 950B. Detector 953 converts filtered component 957 to an electronic signal 958 for processing by computer 956.

Accordingly, electronic signal 958 corresponds to backscattered laser radiation 948 as filtered by scanning atomic line filter 952; and electronic signal 955 corresponds to unfiltered backscattered laser radiation 950A. Electronic signal 955 is thus used to nullify certain anomalies as computer 956 processes electronic signal 958. For example, when processed with electronic signal 958, electronic signal 955 may be used to remove, from electronic signal 958, certain laser transmission power fluctuations in filtered component 957 caused by atmospheric changes in air 944.

Computer 956 includes lookup tables 970 and 972 that may be utilized to determine temperature and/or pressure as discussed below.

Component 943B of the laser radiation 942 is split into two components 959 and 960 by beam splitter 945. Component 960 is directed by beam splitter 945 to scanning atomic line filter 952 via mirrored surface 961, to measure filter characteristics, whereas component 959 is directed by beam splitter 945 to detector 962, to generate electronic signal 963. Electronic signal 963 is, for example, used to normalize power fluctuations in the return of backscattered laser radiation 948 caused by power fluctuations in the generation of laser radiation 942 by fixed laser 941.

Scanning atomic line filter 952 filters component 960 to produce filtered component 964. Filtered component 964 is directed to detector 965, via mirrored surface 966, and then converted to an electronic signal 967. Computer 956 processes electronic signal 967 to determine filter characteristics, such as frequencies and suppression features of scanning atomic line filter 952.

While FIG. 9 shows OADS 940 as having free space optical transmission and optical components such as beam splitters 943, 945, and 951 and mirrors 961 and 966, optical fiber may be used for fixed laser 941 transmission along paths 942, 943A, 943B, 959, 960, 964, 950, 950A, 950B and/or 957; in such an embodiment, fiber splitters may be used in place of beam splitters 943, 951 and 945, and mirrors 961 and/or 966 may be eliminated.

It will also be appreciated that although the embodiment shown in OADS 940 in this figure employs scanning atomic line filter 952, other types of tunable optical filters may be utilized. Examples of other types of tunable optical filters that can be used in addition to or in place of scanning atomic line filter 952 include tunable filters include, for example, monochromators, MEMS based, Lyot filters, rotatable thin-film devices, tunable resonators, acousto-optic filters, liquid crystal modulators, and other suitable types of optical filters that are tunable.

Figure 10:
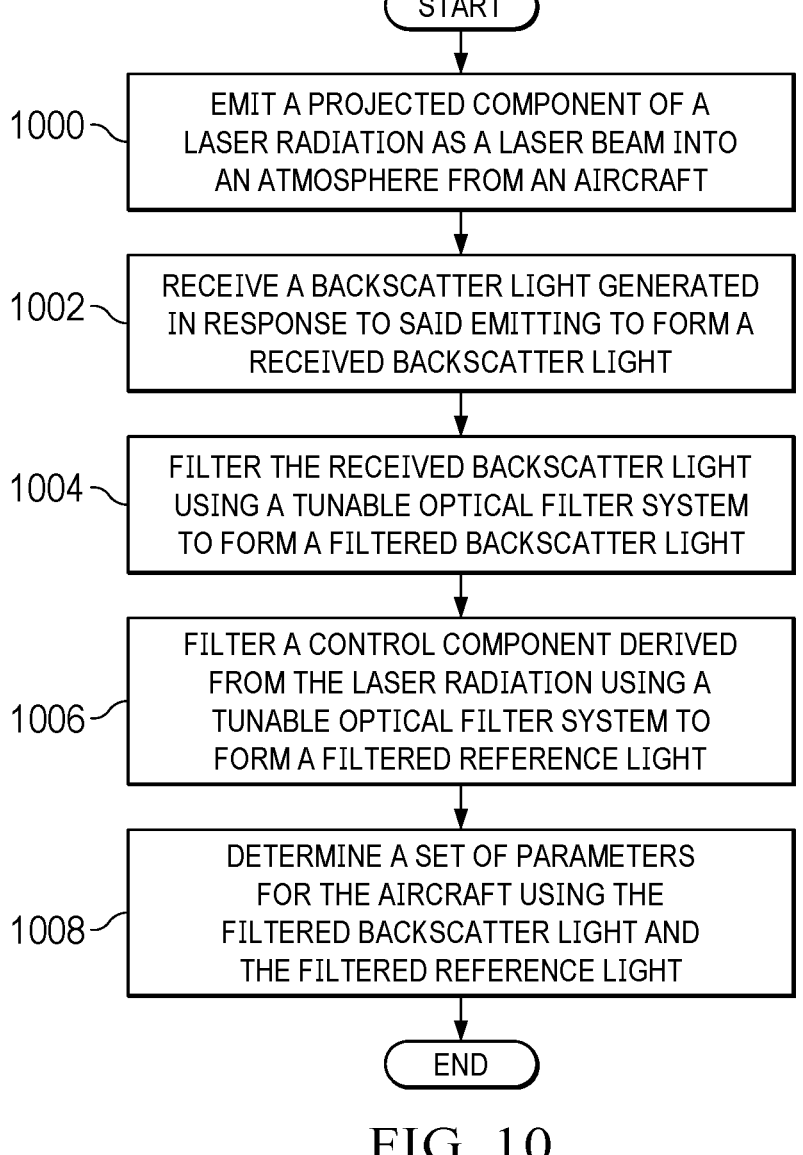
FIG. 10 is an illustration of a flowchart of a process for sensing air in accordance with an illustrative embodiment.

Turning next to FIG. 10, an illustration of a flowchart of a process for sensing air is depicted in accordance with an illustrative embodiment. The process in FIG. 10 can be implemented in hardware, software, or both. When implemented in software, the process can take the form of program instructions that are run by one of more processor units located in one or more hardware devices in one or more computer systems. For example, the process can be implemented in laser sensor system 202 in FIG. 2.

The process begins by emitting a projected component of a laser radiation as a laser beam into an atmosphere from an aircraft (operation 1000). The process receives a backscatter light generated in response to said emitting to form a received backscatter light (operation 1002).

The process filters the received backscatter light using a tunable optical filter system to form a filtered backscatter light (operation 1004). The process filters a control component derived from the laser radiation using a tunable optical filter system to form a filtered reference light (operation 1006). The process determines a set of parameters for the aircraft using the filtered backscatter light and the filtered reference light (operation 1008). The process terminates thereafter.

Figure 11:
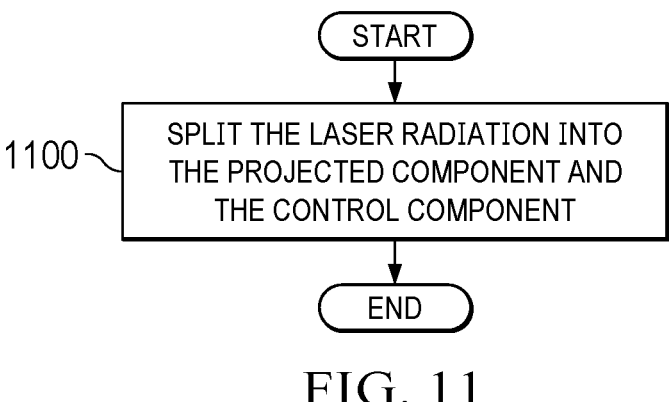
FIG. 11 is an illustration of a flowchart of a process for splitting laser radiation in accordance with an illustrative embodiment.

With reference to FIG. 11, an illustration of a flowchart of a process for splitting laser radiation is depicted in accordance with an illustrative embodiment. The process in FIG. 11 is an example of an additional operation that can be performed with the operations in FIG. 10.

The process splits the laser radiation into the projected component and the control component (operation 1100). The process terminates thereafter. The projected component is emitted as the laser beam and the control component is used as a reference light for determining parameters.

Figure 12:
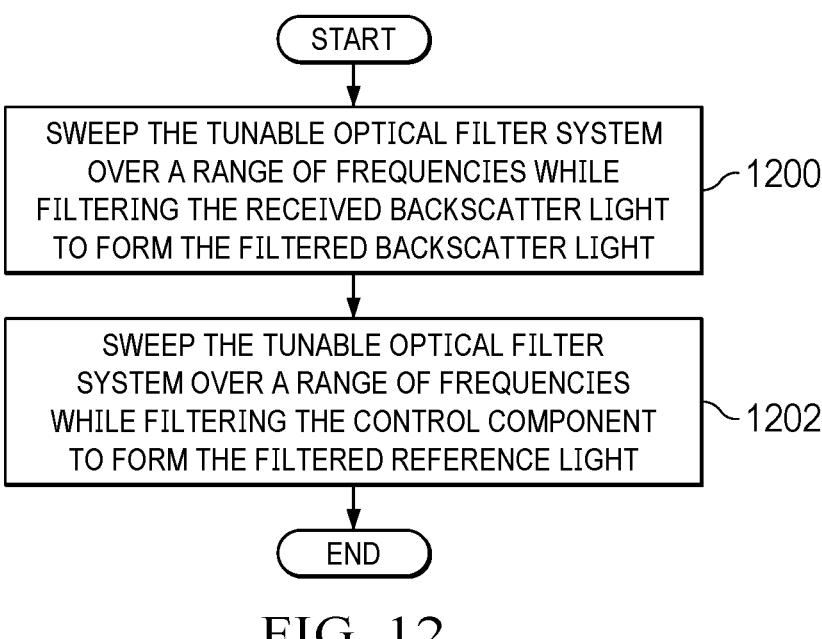
FIG. 12 is an illustration of a flowchart of a process for filtering light in accordance with an illustrative embodiment.

Turning now to FIG. 12, an illustration of a flowchart of a process for filtering light is depicted in accordance with an illustrative embodiment. The process in FIG. 12 is an example of an implementation for operation 1004 and operation 1006 in FIG. 10.

The process begins by sweeping the tunable optical filter system over a range of frequencies while filtering the received backscatter light to form the filtered backscatter light (operation of 1200). The process sweeps the tunable optical filter system over a range of frequencies while filtering the control component to form the filtered reference light (operation 1202). The process terminates thereafter.

In FIG. 12, the tunable optical filter system sweeps through the ranges to pass different frequencies for the received backscatter light and the control component. In one illustrative example, the range of frequencies can be about plus or minus 20 GHz about a center frequency. In another illustrative example, the range of frequencies is about plus or minus 0.0017 percent about a center frequency. The center frequency can be the center frequency of the laser beam. In the illustrative example, scanning can be performed using various increments. For example, the scanning can be in about 100 MHz changes.

Figure 13:
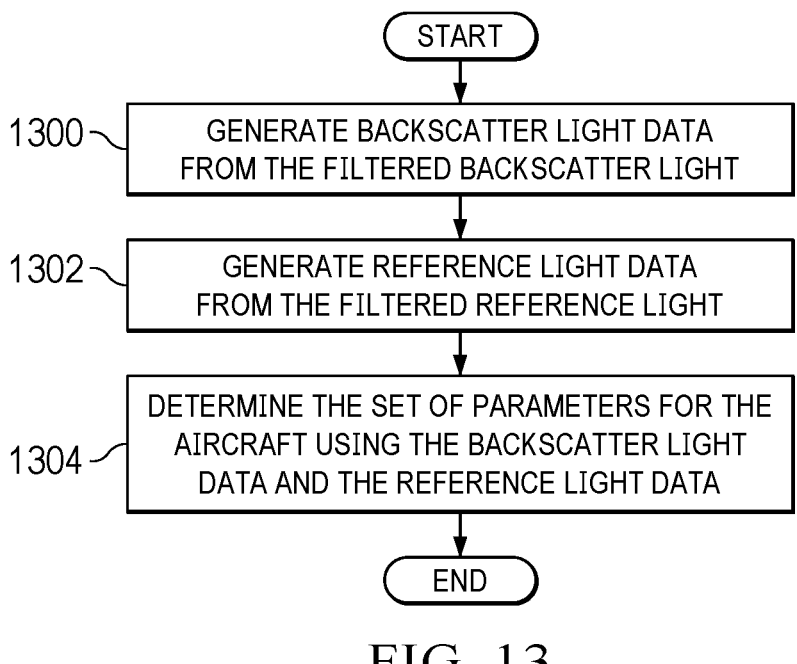
FIG. 13 is an illustration of a flowchart of a process for determining parameters in accordance with an illustrative embodiment.

Turning to FIG. 13, an illustration of a flowchart of a process for determining parameters is depicted in accordance with an illustrative embodiment. The process in FIG. 13 is an example of an implementation for operation 1008 in FIG. 10.

The process generates backscatter light data from the filtered backscatter light (operation 1300). The process generates reference light data from the filtered reference light (operation 1302).

The process determines the set of parameters for the aircraft using the backscatter light data and the reference light data (operation 1304). The process terminates thereafter.

Figure 14:
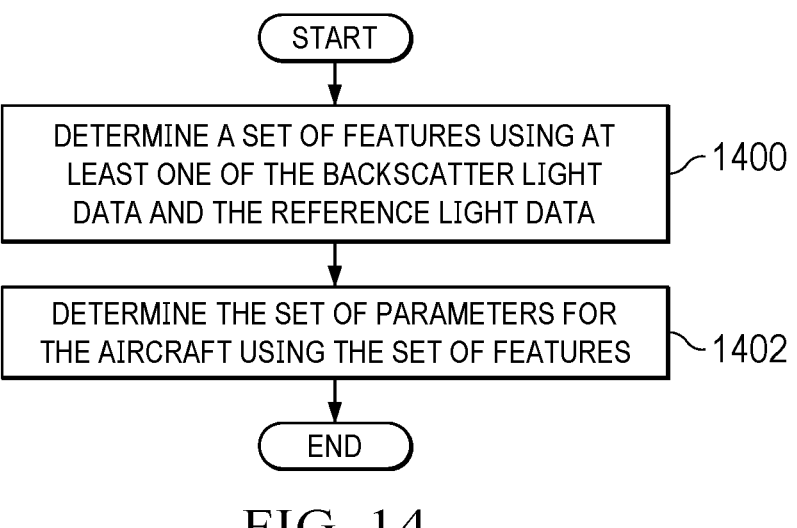
FIG. 14 is an illustration of a flowchart of a process for determining parameters in accordance with an illustrative embodiment.

Next in FIG. 14, an illustration of a flowchart of a process for determining parameters is depicted in accordance with an illustrative embodiment. The process in FIG. 14 is an example of additional operations that can be performed with the operations in FIG. 10.

The process determines a set of features using at least one of the backscatter light data and the reference light data (operation 1400). In operation 1400, the set of features can include a frequency difference between a first minimum signal strength for the filtered reference light and a second minimum signal strength for the filtered backscatter light; a width from first point for a start in a signal strength reduction for the filtered backscatter light from no signal strength change for the filtered backscatter light to a second point for a return to no change signal strength change for the filtered backscatter light after reaching the minimum signal strength for the filtered backscatter light; and a signal strength difference between a first signal strength of the filtered reference light with no changes in the signal strength and a second signal strength of the filtered backscatter light with no changes in the signal strength.

The process determines the set of parameters for the aircraft using the set of features (operation 1402). The process terminates thereafter.

Figure 15:
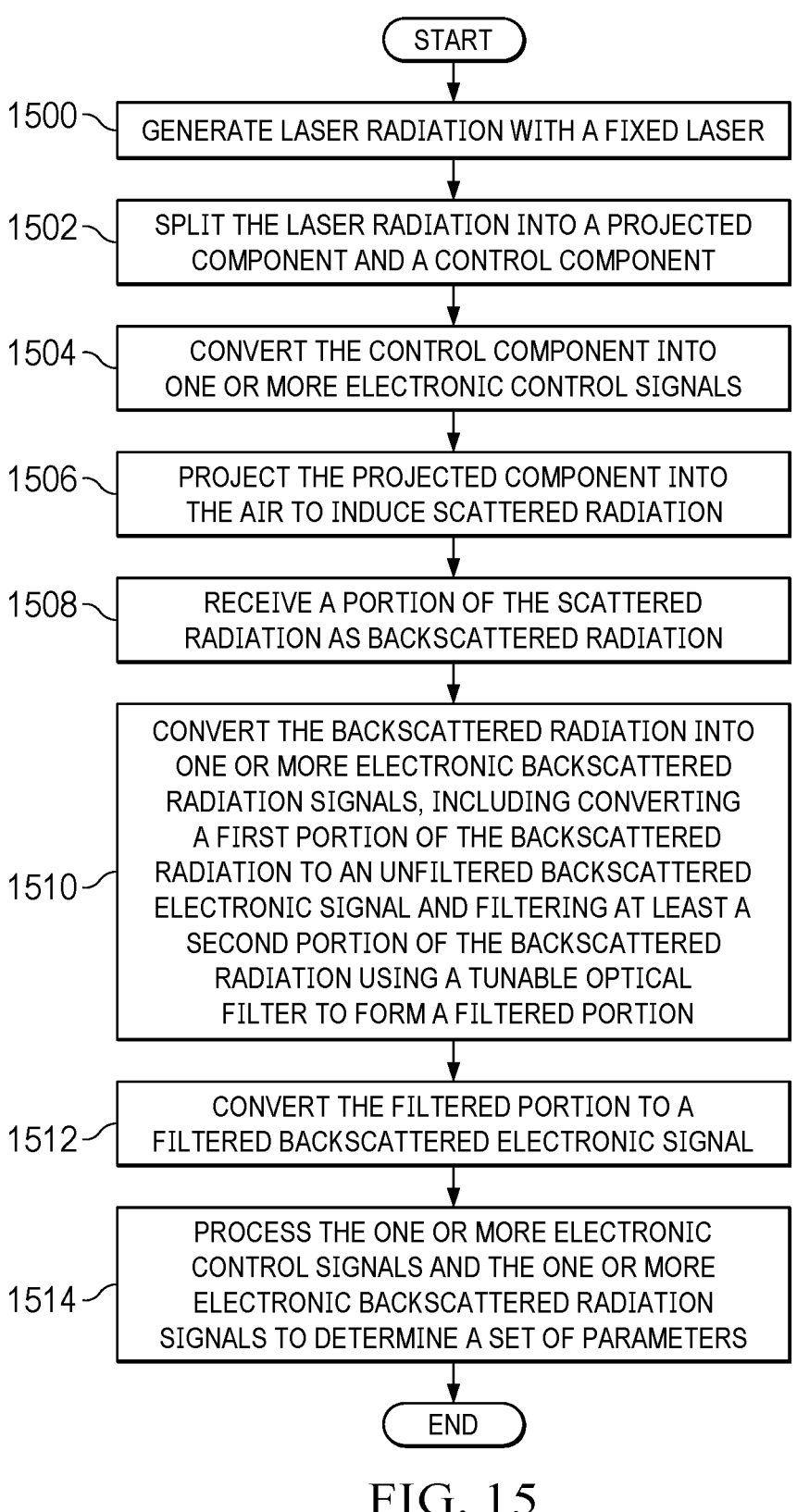
FIG. 15 is an illustration of a flowchart of a process for sensing air in accordance with an illustrative embodiment.

With reference next to FIG. 15, an illustration a flowchart of a process for sensing air is depicted in accordance with an illustrative embodiment. The process illustrated in FIG. 15 can be implemented in OADS 940 in FIG. 9.

The process begins by generating laser radiation with a fixed laser (operation 1500). The process splits the laser radiation into a projected component and a control component (operation 1502). The process converts the control component into one or more electronic control signals (operation 1504).

The process projects the projected component into the air to induce scattered radiation (operation 1506). The process receives a portion of the scattered radiation as backscattered radiation (operation 1508).

The process converts the backscattered radiation into one or more electronic backscattered radiation signals, including converting a first portion of the backscattered radiation to an unfiltered backscattered electronic signal and filtering at least a second portion of the backscattered radiation using a tunable optical filter to form a filtered portion (operation 1510). The process converts the filtered portion to a filtered backscattered electronic signal (operation 1512).

The process processes the one or more electronic control signals and the one or more electronic backscattered radiation signals to determine a set of parameters (operation 1514). The process terminates thereafter.

Turning now to FIG. 16, an illustration of a flowchart of a process for sensing air is depicted in accordance with an illustrative embodiment. The process illustrated in this figure is an example of an implementation of operation 1414 in FIG. 14.

The process begins by processing the one or more electronic control signals and the one or more electronic backscattered radiation signals to determine a Doppler shift (operation 1600). The process processes the Doppler shift determination to determine a speed of an aircraft (operation 1602).

With reference next to FIG. 17, an illustration of a flowchart of a process for detecting objects relative to the vehicle is depicted in accordance with an illustrative embodiment. The process illustrated in this figure can be implemented in laser sensor system 202 in FIG. 2.

The process begins by emitting a projected component of a laser radiation as a set of laser beams into an atmosphere from a vehicle (operation 1700). The process receives a backscatter light generated in response to said emitting the laser beam into the atmosphere to form a received backscatter light (operation 1702).

The process filters the received backscatter light using a tunable optical filter system to form a filtered backscatter light (operation 1704). The process filters a control component derived from the laser radiation using a tunable optical filter system to form a filtered reference light (operation 1706).

The process determines a set of parameters relating a presence of an object to the vehicle using the filtered backscatter light and the filtered reference light (operation 1708). The process terminates thereafter. In operation 1708, the set of parameters relating to the presence of the object can be selected from at least one of whether the object is present, a speed of the object, a velocity of the object, a location of the object relative to the vehicle, or other suitable parameters.

Figure 18:
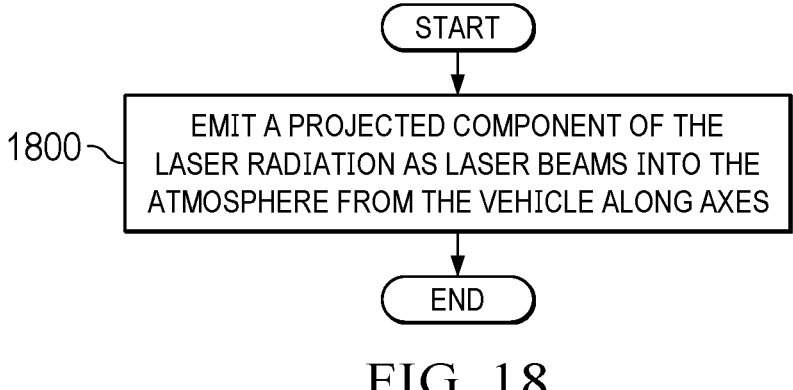
FIG. 18 is an illustration of a flowchart of a process for emitting a projected component in accordance with an illustrative embodiment.

Turning now to FIG. 18, an illustration of a flowchart of a process for emitting a projected component is depicted in accordance with an illustrative embodiment. The process in this figure is an example of an implementation for operation 1700 in FIG. 17.

The process emits a projected component of the laser radiation as laser beams into the atmosphere from the vehicle along axes (operation 1800). The process terminates thereafter. In operation 1800, each of the laser beams is emitted along one of the axes.

Figure 19:
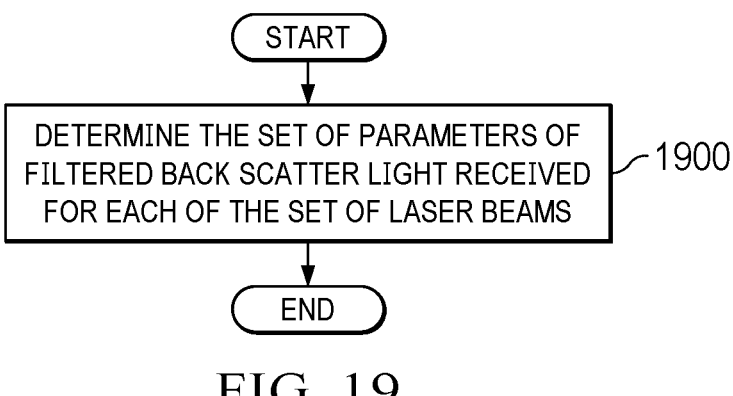
FIG. 19 is an illustration of a flowchart of a process for determining a set of parameters in accordance with an illustrative embodiment.

With reference to FIG. 19, an illustration of a flowchart of process for determining a set of parameters is depicted in accordance with an illustrative embodiment. The process illustrated in FIG. 19 is an example of an additional operation that can be performed with operation 1800 in FIG. 18.

The process determines the set of parameters of filtered backscatter light received for each of the set of laser beams (operation 1900). The process terminates thereafter.

Figure 20:
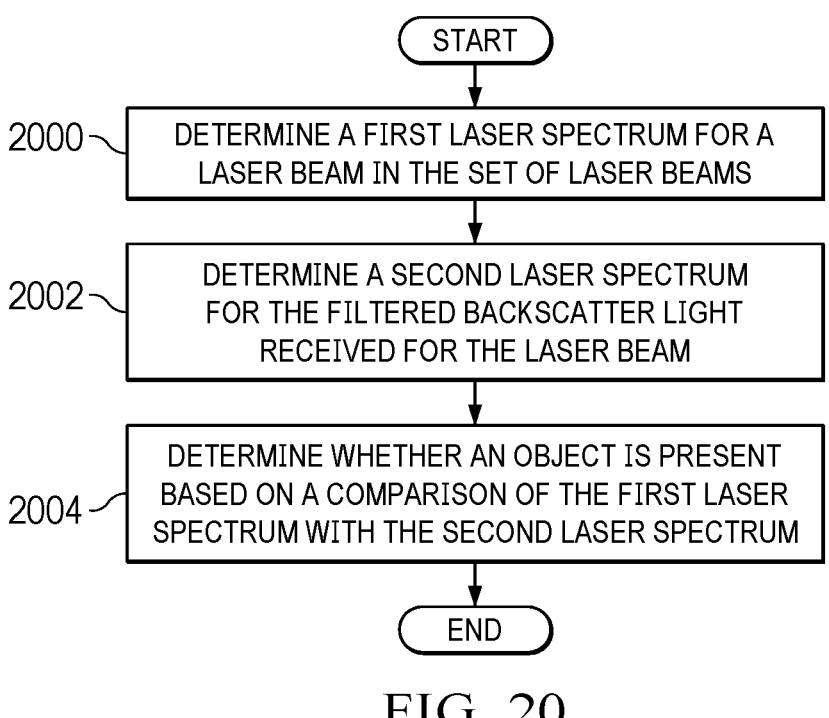
FIG. 20 is an illustration of a flowchart of a process for determining a set of parameters in accordance with an illustrative embodiment.

Next in FIG. 20, an illustration of a flowchart of process for determining a set of parameters is depicted in accordance with an illustrative embodiment. The process illustrated in FIG. 19 is an example of an implementation for operation 1708 in FIG. 17.

The process begins by determining a first laser spectrum for a laser beam in the set of laser beams (operation 2000). The process determines a second laser spectrum for the filtered backscatter light received for the laser beam (operation 2002).

The process determines whether an object is present based on a comparison of the first laser spectrum with the second laser spectrum (operation 2004). The process terminates thereafter.

Figure 21:
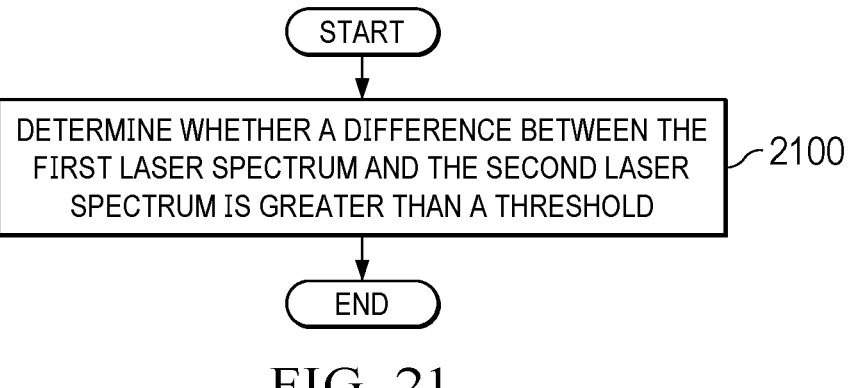
FIG. 21 is an illustration of a flowchart of a process for determining whether an object is present in accordance with an illustrative embodiment.

Turning to FIG. 21, an illustration of a flowchart of a process for determining whether an object is present is depicted in accordance with an illustrative embodiment. The process in this figure is an example of an implementation for operation 2004 in FIG. 20.

The process determines whether a difference between the first laser spectrum and the second laser spectrum is greater than a threshold (operation 2100). The process terminates thereafter.

Figure 22:
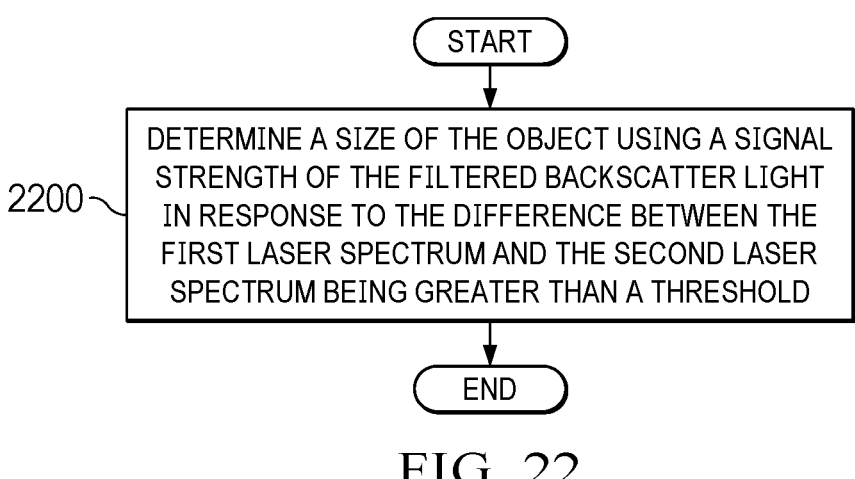
FIG. 22 is an illustration of a flowchart of a process for determining a set of parameters in accordance with an illustrative embodiment.

Next in FIG. 22, an illustration of a flowchart of a process for determining a set of parameters is depicted in accordance with an illustrative embodiment. The operation in this figure is an example of an additional operation that can be performed with operation 2100 in FIG. 21.

The process determines a size of the object using a signal strength of the filtered backscatter light in response to the difference between the first laser spectrum and the second laser spectrum being greater than a threshold (operation 2200). The process terminates thereafter.

Figure 23:
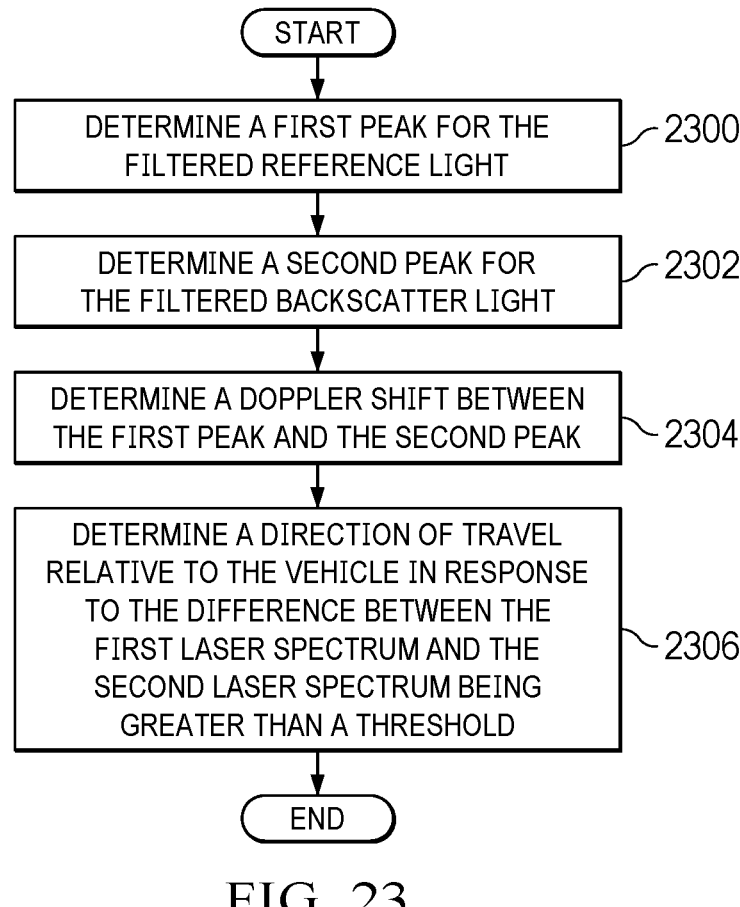
FIG. 23 is an illustration of a flowchart of a process for determining a set of parameters in accordance with an illustrative embodiment.

With reference now to FIG. 23, an illustration a flowchart of a process for determining a set of parameters is depicted in accordance with an illustrative embodiment. The process illustrated in this figure is an example of additional operations that can be performed with operation 2100 in FIG. 21.

The process begins by determining a first peak for the filtered reference light (operation 2300). The process determines a second peak for the filtered backscatter light (operation 2302).

The process determines a Doppler shift between the first peak and the second peak (operation 2304). The process determines a direction of travel relative to the vehicle in response to the difference between the first laser spectrum and the second laser spectrum being greater than a threshold (operation 2306). The process terminates thereafter.

In FIG. 24, an illustration of a flowchart of a process for determining a laser linewidth for a laser light is depicted in accordance with an illustrative embodiment. The process in FIG. 24 The process illustrated in this figure can be implemented in laser sensor system 202 in FIG. 2.

The process begins by receiving a laser light (operation 2400). In operation 2400, the laser light can be a component of laser radiation. This component can be selected from a control component for a reference light or a backscatter light generated in response to the emitting of a projected component in the form of a laser beam. In other words, the laser light can be one of a reference light derived from a laser beam or a backscatter light generated in response to emitting a laser beam.

The process filters the laser light using a tunable optical filter system to form a filtered laser light (operation 2402). The process detects the filtered laser light to generate laser light data (operation 2404).

The process determines a laser linewidth for the laser light using the laser light data (operation 2406). The process terminates thereafter. In operation 2406, the laser light data can be, for example, a signal strength versus time curve, such as curve 832 and curve 834 in FIG. 8. This laser light data can be compared with historical laser light data for known laser linewidths. Further, adjustments can be made to compare the laser light data with the historical data when the temperature of the atmosphere is known for when the laser light was received.

For example, the laser light can be for a laser beam emitted by a laser beam generator of a particular type and configuration. The laser light data generated for this laser light can be compared to historical data for the same or similar laser beam generator. The comparison can also be made to determine whether the laser beam generator is emitting the laser beam with a desired laser line width or if the laser linewidth is not within a threshold. For example, the comparison may indicate that the laser linewidth may be too narrow or too broad to use based on the tolerances specified for a particular use of the laser light.

With reference to FIG. 25, an illustration of a flowchart of a process for determining the movement of an object relative to the vehicle is depicted in accordance with an illustrative embodiment. The process illustrated in this figure can be implemented in laser sensor system 202 in FIG. 2.

The process begins by emitting a projected component of a laser radiation as a set of laser beams into an atmosphere from the vehicle (operation 2500). The process receives a backscatter light generated in response to said emitting the laser beam into the atmosphere to form a received backscatter light (operation 2502).

The process filters the received backscatter light using a tunable optical filter system to form a filtered backscatter light (operation 2504). The process determines the movement of the object relative to the vehicle using the filtered backscatter light (operation 2506). The process terminates thereafter. In operation, 2506, a speed of the object relative to the aircraft can be determined.

Further, the process in FIG. 25 can include detecting a signal strength of the filtered backscatter light over time and determining a time based rate of change in the signal strength can be determined over the time. With these operations, the process in operation 2506 can determine the movement of the object relative to the vehicle using the time based rate of change in the signal strength of the filtered backscatter light over the time.

In another example, the speed of the aircraft changes while emitting the projected component of the laser beam. In this case, the process in operation 2506 can determine a direction of movement for an object relative to aircraft using a frequency shift in the filtered backscatter light.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, operation 1006 can be omitted when the reference light is not used to determine parameters for the aircraft in operation 1008.

Figure 26:
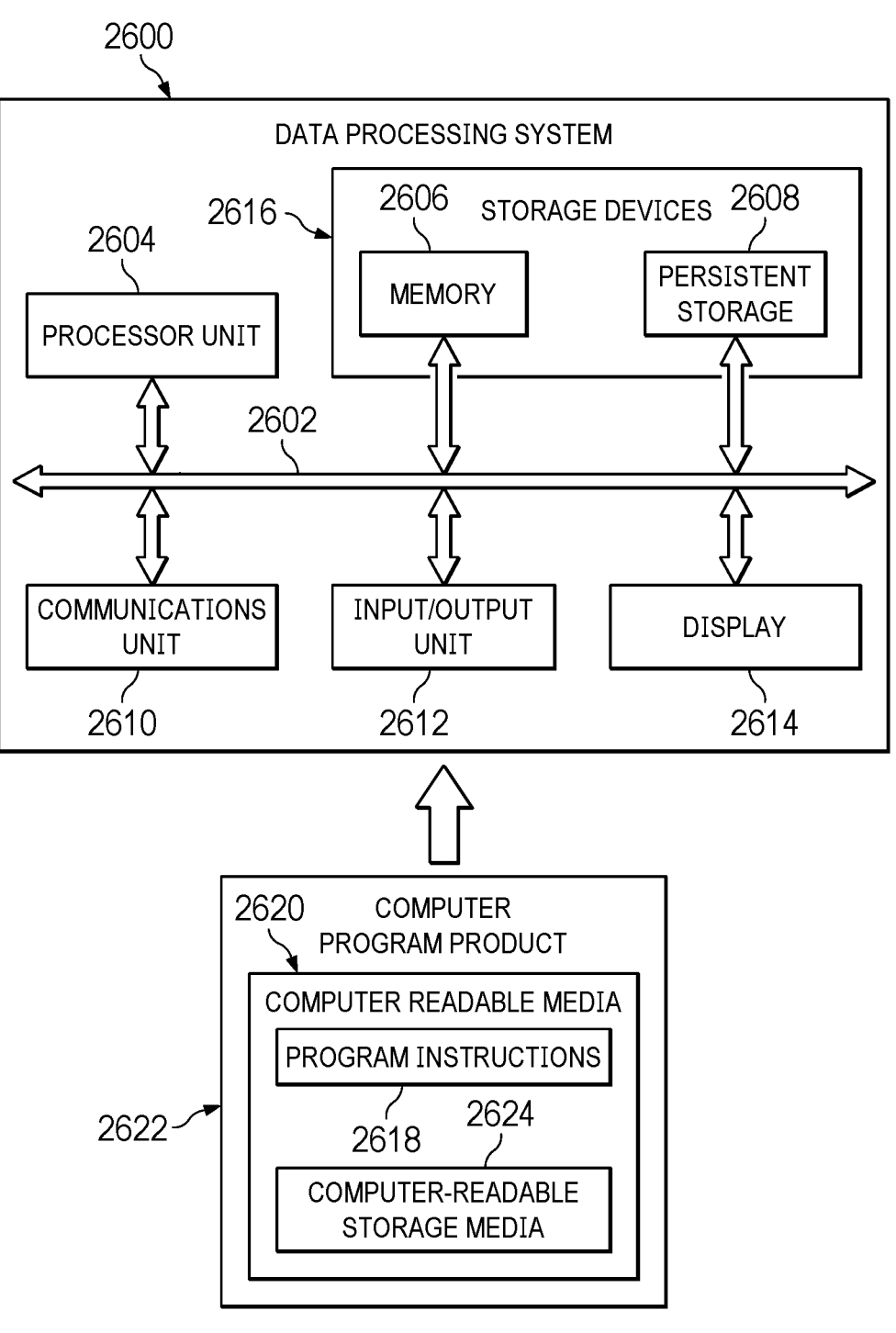
FIG. 26 is an illustration of a block diagram of a data processing system in accordance with an illustrative embodiment.

Turning now to FIG. 26, a block diagram of a data processing system is depicted in accordance with an illustrative embodiment. Data processing system 2600 can also be used to implement computer system 212 in FIG. 2. In this illustrative example, data processing system 2600 includes communications framework 2602, which provides communications between processor unit 2604, memory 2606, persistent storage 2608, communications unit 2610, input/output (I/O) unit 2612, and display 2614. In this example, communications framework 2602 takes the form of a bus system.

Processor unit 2604 serves to execute instructions for software that can be loaded into memory 2606. Processor unit 2604 includes one or more processors. For example, processor unit 2604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2604 can be implemented using one or more heterogeneous processor systems in which a main processor is present with secondary processors on a single chip. As another illustrative example, processor unit 2604 can be a symmetric multi-processor system containing multiple processors of the same type on a single chip.

Memory 2606 and persistent storage 2608 are examples of storage devices 2616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2616 may also be referred to as computer-readable storage devices in these illustrative examples. Memory 2606, in these examples, can be, for example, a random-access memory or any other suitable volatile or non-volatile storage device. Persistent storage 2608 may take various forms, depending on the particular implementation.

For example, persistent storage 2608 may contain one or more components or devices. For example, persistent storage 2608 can be a hard drive, a solid-state drive (SSD), a flash memory, a rewritable optical disk, a rewritable magnetic tape, or some combination of the above. The media used by persistent storage 2608 also can be removable. For example, a removable hard drive can be used for persistent storage 2608.

Communications unit 2610, in these illustrative examples, provides for communications with other data processing systems or devices. In these illustrative examples, communications unit 2610 is a network interface card.

Input/output unit 2612 allows for input and output of data with other devices that can be connected to data processing system 2600. For example, input/output unit 2612 may provide a connection for user input through at least one of a keyboard, a mouse, or some other suitable input device. Further, input/output unit 2612 may send output to a printer. Display 2614 provides a mechanism to display information to a user.

Instructions for at least one of the operating systems, applications, or programs can be located in storage devices 2616, which are in communication with processor unit 2604 through communications framework 2602. The processes of the different embodiments can be performed by processor unit 2604 using computer-implemented instructions, which may be located in a memory, such as memory 2606.

These instructions are referred to as program instructions, computer usable program instructions, or computer-readable program instructions that can be read and executed by a processor in processor unit 2604. The program instructions in the different embodiments can be embodied on different physical or computer-readable storage media, such as memory 2606 or persistent storage 2608.

Program instructions 2618 is located in a functional form on computer-readable media 2620 that is selectively removable and can be loaded onto or transferred to data processing system 2600 for execution by processor unit 2604. Program instructions 2618 and computer-readable media 2620 form computer program product 2622 in these illustrative examples. In the illustrative example, computer-readable media 2620 is computer-readable storage media 2624.

Computer-readable storage media 2624 is a physical or tangible storage device used to store program instructions 2618 rather than a medium that propagates or transmits program instructions 2618. Computer-readable storage media 2624 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 2624, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 2618 can be transferred to data processing system 2600 using a computer-readable signal media. The computer-readable signal media are signals and can be, for example, a propagated data signal containing program instructions 2618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2620" can be singular or plural. For example, program instructions 2618 can be located in computer-readable media 2620 in the form of a single storage device or system. In another example, program instructions 2618 can be located in computer-readable media 2620 that is distributed in multiple data processing systems. In other words, some instructions in program instructions 2618 can be located in one data processing system while other instructions in program instructions 2618 can be located in one data processing system. For example, a portion of program instructions 2618 can be located in computer-readable media 2620 in a server computer while another portion of program instructions 2618 can be located in computer-readable media 2620 located in a set of client computers.

The different components illustrated for data processing system 2600 are not meant to provide architectural limitations to the manner in which different embodiments can be implemented. In some illustrative examples, one or more of the components may be incorporated in or otherwise form a portion of, another component. For example, memory 2606, or portions thereof, may be incorporated in processor unit 2604 in some illustrative examples. The different illustrative embodiments can be implemented in a data processing system including components in addition to or in place of those illustrated for data processing system 2600. Other components shown in FIG. 26 can be varied from the illustrative examples shown. The different embodiments can be implemented using any hardware device or system capable of running program instructions 2618.

Figures 27, 28:
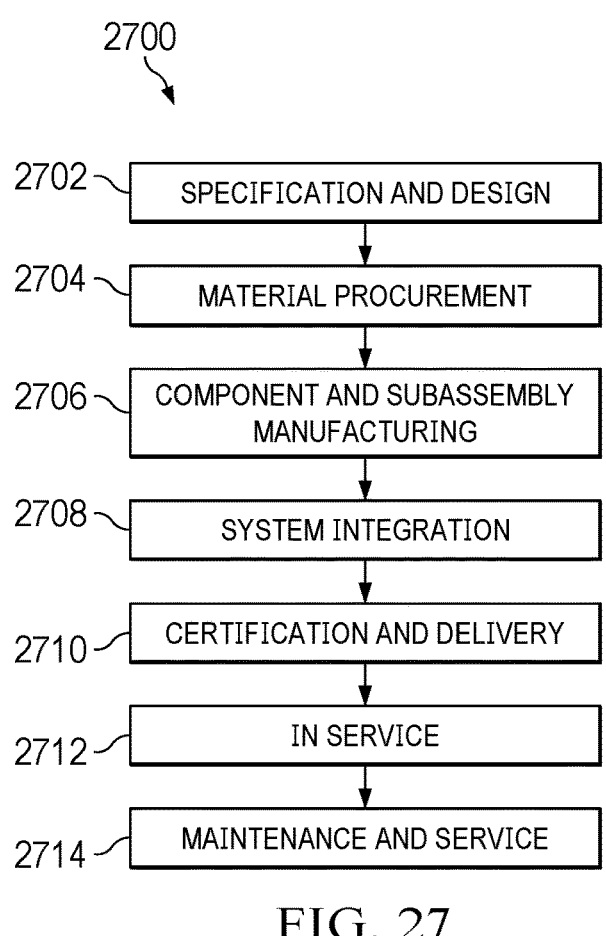
FIG. 27 is an illustration of an aircraft manufacturing and service method in accordance with an illustrative embodiment.
FIG. 28 is an illustration of a block diagram of an aircraft in which an illustrative embodiment may be implemented.

Illustrative embodiments of the disclosure may be described in the context of aircraft manufacturing and service method 2700 as shown in FIG. 27 and aircraft 2800 as shown in FIG. 28. Turning first to FIG. 27, an illustration of an aircraft manufacturing and service method is depicted in accordance with an illustrative embodiment. During preproduction, aircraft manufacturing and service method 2700 may include specification and design 2702 of aircraft 2800 in FIG. 28 and material procurement 2704.

During production, component and subassembly manufacturing 2706 and system integration 2708 of aircraft 2800 in FIG. 28 takes place. Thereafter, aircraft 2800 in FIG. 28 can go through certification and delivery 2710 in order to be placed in service 2712. While in service 2712 by a customer, aircraft 2800 in FIG. 28 is scheduled for routine maintenance and service 2714, which may include modification, reconfiguration, refurbishment, and other maintenance or service.

Each of the processes of aircraft manufacturing and service method 2700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 28, an illustration of an aircraft is depicted in which an illustrative embodiment may be implemented. In this example, aircraft 2800 is produced by aircraft manufacturing and service method 2700 in FIG. 27 and may include airframe 2802 with plurality of systems 2804 and interior 2806. Examples of systems 2804 include one or more of propulsion system 2808, electrical system 2810, hydraulic system 2812, and environmental system 2814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2700 in FIG. 27.

In one illustrative example, components or subassemblies produced in component and subassembly manufacturing 2706 in FIG. 27 can be fabricated or manufactured in a manner similar to components or subassemblies produced while aircraft 2800 is in service 2712 in FIG. 27. As yet another example, one or more apparatus embodiments, method embodiments, or a combination thereof can be utilized during production stages, such as component and subassembly manufacturing 2706 and system integration 2708 in FIG. 27. One or more apparatus embodiments, method embodiments, or a combination thereof may be utilized while aircraft 2800 is in service 2712, during maintenance and service 2714 in FIG. 27, or both. The use of a number of the different illustrative embodiments may substantially expedite the assembly of aircraft 2800, reduce the cost of aircraft 2800, or both expedite the assembly of aircraft 2800 and reduce the cost of aircraft 2800.

In the illustrative examples, a laser sensor system such as laser sensor system 202 in FIG. 2 can be placed into aircraft 2800 during system integration 2708. Additionally, laser sensor system 202 can be added to aircraft 2800 during maintenance and service 2714. For example, this laser system can be added during modification, reconfiguration, refurbishment, and other maintenance or service that occurs in maintenance and service 2714.

Further, laser sensor system 202 can be used during in service 2712 to determine parameters for aircraft 2800. For example, this laser sensor system can be used to determine the speed of aircraft, detect objects such as a flock of birds, and determine other parameters that may be used during the operation of aircraft 2800. Further, laser sensor system 202 can include a diagnostic function in which a laser linewidth can be determined for a laser beam generated by a laser generator. This laser linewidth can be used to determine whether the laser generator is operating within tolerance.

Thus, a method, apparatus, system, and computer program product are provided for sensing air. A projected component of a laser radiation is emitted as a set of laser beams into an atmosphere from an aircraft. A backscatter light generated in response to said emitting the set of laser beams into the atmosphere is received to form a received backscatter light. The received backscatter light is filtered using a tunable optical filter system to form a filtered backscatter light. A control component derived from the laser radiation is filtered using the tunable optical filter system to form a filtered reference light. A set of parameters is determined for the aircraft using the filtered backscatter light and the filtered reference light.

In the different illustrative examples, the tunable optical filter system enables sweeping through different frequencies of the backscatter light. By using the tunable optical filter system to pass different frequencies of the backscatter light, a fixed laser generator can be used in place of one that sweeps. As result, a greater selection of laser beam generators can be used in the different illustrative examples. Further, the illustrative examples can be used with a laser beam that sweeps through frequencies in addition to being used with a fixed laser beam generator.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes," "including," "has," "contains," and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting an object relative to a vehicle, the method comprising:

emitting a projected component of a laser radiation as a set of laser beams into an atmosphere from the vehicle;

receiving a backscatter light generated in response to said emitting the set of laser beams into the atmosphere to form a received backscatter light;

filtering, using a tunable optical filter system, the received backscatter light to form a filtered backscatter light;

filtering, using the tunable optical filter system, a control component derived from the laser radiation to form a filtered reference light;

detecting a signal strength of the filtered backscatter light over time; and determining, using the filtered backscatter light and the filtered reference light;

a set of parameters relating a presence of the object relative to the vehicle;

a time based rate of change in the signal strength over the time; and using the time based rate of change in the signal strength of the filtered backscatter light over the time, a movement of the object relative to the vehicle.

2. The method of claim 1, further comprising:

emitting the projected component of the laser radiation as laser beams into the atmosphere from the vehicle along axes, wherein each of the laser beams is emitted along one of the axes.

3. The method of claim 2, wherein said determining the set of parameters comprises:

determining the set of parameters from filtered backscatter light received for each of the set of laser beams.

4. The method of claim 1, wherein said determining the set of parameters comprises:

determining a first laser spectrum for a laser beam in the set of laser beams;

determining a second laser spectrum for the filtered backscatter light received for the laser beam; and determining whether the object is present based on a comparison of the first laser spectrum with the second laser spectrum.

5. The method of claim 4, wherein said determining whether the object is present comprises:

determining whether a difference between the first laser spectrum and the second laser spectrum is greater than a threshold.

6. The method of claim 5, wherein said determining the set of parameters comprises:

determining a size of the object using a signal strength of the filtered backscatter light in response to the difference between the first laser spectrum and the second laser spectrum being greater than the threshold.

7. The method of claim 5, wherein said determining the set of parameters comprises:

determining a first peak for the filtered reference light;

determining a second peak for the filtered backscatter light;

determining a Doppler shift between the first peak and the second peak; and determining a direction of travel relative to the vehicle in response to the difference between the first laser spectrum and the second laser spectrum being greater than the threshold.

8. The method of claim 5, wherein said determining the set of parameters comprises:

determining a size of the object based on the difference between the first laser spectrum and the second laser spectrum in response to the difference between the first laser spectrum and the second laser spectrum being greater than the threshold.

9. The method of claim 1, wherein the set of parameters are selected from at least one of whether the object is present, a speed of the object, a velocity of the object, or a location of the object relative to the vehicle.

10. The method of claim 1, wherein the object is selected from one of a bird, a flock of birds, an aircraft, debris, an antenna, another vehicle, a building, a person, a curb, a pedestrian, or a bicycle.

11. A laser sensor system that comprises:

a laser beam generator configured to emit a projected component of a laser radiation as a set of laser beams into an atmosphere from a vehicle;

a receiver configured to receive a backscatter light generated in response to emitting the set of laser beams into the atmosphere to form a received backscatter light;

a tunable optical filter system configured to filter:

the received backscatter light and form a filtered backscatter light; and a control component derived from the laser radiation to form a filtered reference light;

a detection system configured to:

detect a signal strength of the filtered backscatter light over time;

generate backscatter light data in response to detecting the filtered backscatter light;

generate reference light data in response to detecting the filtered reference light; and an analyzer configured to determine;

a time based rate of change in the signal strength over the time;

a movement of an object relative to the vehicle based upon the time based rate of change in the signal strength of the filtered backscatter light over the time; and a presence of an object relative to the vehicle using the backscatter light data and the reference light data.

12. The laser sensor system of claim 11, wherein in emitting the projected component, the laser beam generator is configured to:

emit the projected component of the laser radiation as laser beams into the atmosphere from the vehicle along axes, wherein each of the laser beams is emitted along one of the axes.

13. The laser sensor system of claim 12, wherein in determining the set of parameters, the analyzer is configured to:

determine the set of parameters from filtered backscatter light received for each of the set of laser beams.

14. The laser sensor system of claim 11, wherein in determining the set of parameters, the analyzer is configured to:

determine a first laser spectrum for a laser beam in the set of laser beams;

determine a second laser spectrum for the filtered backscatter light received for the laser beam; and determine whether the object is present based on a comparison of the first laser spectrum with the second laser spectrum.

15. The laser sensor system of claim 14, wherein in determining whether the object is present, the analyzer is configured to:

determine whether a difference between the first laser spectrum and the second laser spectrum is greater than a threshold.

16. The laser sensor system of claim 15, wherein in determining the set of parameters, the analyzer is configured to:

determine a size of the object based on the difference between the first laser spectrum and the second laser spectrum in response to the difference being greater than the threshold.

17. The laser sensor system of claim 15, wherein in determining the set of parameters, the analyzer is configured to:

determine a first peak for the filtered reference light;

determine a second peak for the filtered backscatter light;

determine a Doppler shift between the first peak and the second peak; and determine a direction of travel relative to the vehicle in response to the difference between the first laser spectrum and the second laser spectrum being greater than the threshold.

18. The laser sensor system of claim 15, wherein in determining the set of parameters, the analyzer is configured to:

determine a size of the object based on the difference between the first laser spectrum and the second laser spectrum in response to the difference between the first laser spectrum and the second laser spectrum being greater than the threshold.

19. The laser sensor system of claim 11, wherein the set of parameters are selected from at least one of whether the object is present, a speed of the object, a velocity of the object, or a location of the object relative to the vehicle.

20. The laser sensor system of claim 11, wherein the object is selected from one of a bird, a flock of birds, an aircraft, debris, an antenna, another vehicle, a building, a person, a curb, a pedestrian, or a bicycle.

21. A method for detecting a movement of an object relative to a vehicle, the method comprising:

emitting a projected component of a laser radiation as a set of laser beams into an atmosphere from the vehicle;

receiving a backscatter light generated in response to said emitting to form a received backscatter light;

filtering the received backscatter light using a tunable optical filter system to form a filtered backscatter light;

detecting a signal strength of the filtered backscatter light over time;

determining a time based rate of change in the signal strength over the time;

determining the movement of the object relative to the vehicle using the time based rate of change in the signal strength of the filtered backscatter light over the time; and determining the movement of the object relative to the vehicle using the filtered backscatter light.

22. The method of claim 21, wherein said determining comprises:

determining a speed of the object relative to the vehicle.

23. The method of claim 21, wherein a speed of the vehicle changes during said emitting, and wherein said determining the movement comprises:

determining a direction of movement for the object relative to the vehicle aircraft using a frequency shift in the filtered backscatter light.

* * * * *